US012765715B2

(12) United States Patent
Du et al.

(10) Patent No.: US 12,765,715 B2
(45) Date of Patent: Oct. 20, 2026

(54) COOKING APPARATUS, CONTROL METHOD THEREOF, HEATING CONTROL METHOD, AND SERVER

(71) Applicants: Guangdong Midea Kitchen Appliances Manufacturing Co., Ltd., Foshan (CN); Midea Group Co., Ltd., Foshan (CN)

(72) Inventors: Haibo Du, Foshan (CN); Ming Wang, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 1159 days.

(21) Appl. No.: 17/750,098

(22) Filed: May 20, 2022

(65) Prior Publication Data

US 2022/0273134 A1 Sep. 1, 2022

Related U.S. Application Data

(63) Continuation of application No. PCT/CN2020/124888, filed on Oct. 29, 2020.

(30) Foreign Application Priority Data

Nov. 20, 2019 (CN) ......................... 201911143400.7
Apr. 30, 2020 (CN) ......................... 202010357645.4
Apr. 30, 2020 (CN) ......................... 202010360683.7

(51) Int. Cl.

*A47J 36/24* (2006.01)
*A47J 36/32* (2006.01)
*F24C 7/08* (2006.01)

(52) U.S. Cl.

CPC ........... *A47J 36/2483* (2013.01); *A47J 36/32* (2013.01); *F24C 7/08* (2013.01)

(58) Field of Classification Search

CPC ...... A47J 36/2483; A47J 36/32; A47J 36/321; A47J 37/0664; A47J 37/0623;
(Continued)

(56) References Cited

U.S. PATENT DOCUMENTS

2016/0327281 A1* 11/2016 Bhogal ................... F24C 7/087
2018/0324908 A1* 11/2018 Denker ................ H05B 6/6467
(Continued)

FOREIGN PATENT DOCUMENTS

CN 1314124 A 9/2001
CN 102022762 A 4/2011
(Continued)

OTHER PUBLICATIONS

Midea Group Co., Ltd., Chinese Office Action, CN Patent Application No. 202010360683.7, Jan. 18, 2023, 15 pgs.
(Continued)

*Primary Examiner* — Phuong T Nguyen
(74) *Attorney, Agent, or Firm* — Morgan, Lewis & Bockius LLP

(57) ABSTRACT

A cooking apparatus includes heating devices and heating regions, the heating regions are provided with a heating device, a memory, and a processor. The memory stores a computer program comprising instructions that, when executed by the processor, cause the processor to perform operations including: acquiring image information of food in the cooking apparatus; identifying the image information, and acquiring a food type and a cooking doneness of food corresponding to any one of the heating regions; and controlling, according to the food type and the cooking doneness of the food, operation of the heating device in the
(Continued)

corresponding heating region. The cooking apparatus controls the heating of food by cooking region based on the food type and the cooking doneness of the food, thereby achieving uniform food heating, providing a consistent overall cooking doneness, preventing parts of the food from being burned or undercooked, and improving cooking performance.

14 Claims, 14 Drawing Sheets

(58) Field of Classification Search
CPC .... H05B 1/0263; H05B 6/687; H05B 6/6455; H05B 6/72; H05B 6/76; H05B 6/6447; H05B 6/70; H05B 6/68; H05B 6/668
USPC ......... 99/331, 332, 325, 326, 334, 341, 348, 99/486; 219/702, 711, 707, 720, 714
See application file for complete search history.

(56) References Cited

U.S. PATENT DOCUMENTS

| | | | |
|---|---|---|---|
| 2019/0008320 | A1 | 1/2019 | Cheng |
| 2019/0110638 | A1 | 4/2019 | Li et al. |
| 2019/0242584 | A1 | 8/2019 | Ebert et al. |

FOREIGN PATENT DOCUMENTS

| | | | |
|---|---|---|---|
| CN | 103592227 | A | 2/2014 |
| CN | 104905702 | A | 9/2015 |
| CN | 106196810 | A | 12/2016 |
| CN | 106604438 | A | 4/2017 |
| CN | 106664753 | A | 5/2017 |
| CN | 106774518 | A | 5/2017 |
| CN | 206481470 | U | 9/2017 |
| CN | 107806656 | A | 3/2018 |
| CN | 107889286 | A | 4/2018 |
| CN | 108309021 | A | 7/2018 |
| CN | 108646625 | A | 10/2018 |
| CN | 109062277 | A | 12/2018 |
| CN | 109491420 | A | 3/2019 |
| CN | 109527963 | A | 3/2019 |
| CN | 109716027 | A | 5/2019 |
| CN | 109730520 | A | 5/2019 |
| CN | 110874059 | A | 3/2020 |
| CN | 110887069 | A | 3/2020 |
| CN | 111358306 | A | 7/2020 |
| CN | 111513583 | A | 8/2020 |
| DE | 102007048834 | A1 | 4/2008 |
| DE | 102008042804 | B4 | 7/2013 |
| JP | 3025919 | B2 | 1/2000 |
| JP | 2018082844 | A | 5/2018 |
| WO | WO 2019208342 | A1 | 10/2019 |

OTHER PUBLICATIONS

Midea Group Co., Ltd., Chinese Office Action, CN Patent Application No. 202010360683.7, May 19, 2023, 35 pgs.
Midea Group Co., Ltd., Extended European Search Report, Supplementary Search Report, and Partial Supplementary Search Report, EP20889491.5, Jan. 25, 2023, 32 pgs.
Midea Group Co., Ltd., 1st CN Office Action, CN Patent Application No. 201911143400.7, Jun. 9, 2020, 9 pgs.
Midea Group Co., Ltd., 1st CN Office Action, CN Patent Application No. 202010360683.7, Dec. 31, 2020, 19 pgs.
Midea Group Co., Ltd., 1st CN Office Action, CN Patent Application No. 202010367645.4, Nov. 20, 2020, 12 pgs.
Midea Group Co., Ltd., 2nd CN Office Action, CN Patent Application No. 201911143400.7, May 31, 2021, 8 pgs.
Midea Group Co., Ltd., ISRWO, PCT/CN2020/124888, Jan. 21, 2021, 8 pgs.
Midea Group Co., Ltd., IPRP, PCT/CN2020/124888, May 17, 2022, 5 pgs.
Midea Group Co., Ltd., Extended European Search Report, EP23197260.5, Oct. 9, 2023, 10 pgs.
Guangdong Midea Kitchen Appliances Manufacturing Co., Ltd et al., European Office Action, EP Patent Application No. 23197260.5, Feb. 17, 2026, 5 pgs.

* cited by examiner

COOKING APPARATUS, CONTROL METHOD THEREOF, HEATING CONTROL METHOD, AND SERVER

RELATED APPLICATIONS

This application is a continuation of PCT International Application No. PCT/CN2020/124888, filed Oct. 29, 2020 entitled "Cooking Apparatus, Control Method Thereof, Heating Control Method, and Server," which claims priority to (1) Chinese Patent Application No. 201911143400.7 filed with China National Intellectual Property Administration on Nov. 20, 2019 and entitled "Cooking Apparatus, Control Method thereof, and Computer Readable Storage Medium," (2) Chinese Patent Application No. 202010360683.7 filed with China National Intellectual Property Administration on Apr. 30, 2020 and entitled "Control method for Cooking Apparatus, Cooking Apparatus, Server, and Storage Medium," and (3) Chinese Patent Application No. 202010367645.4 filed with China National Intellectual Property Administration on Apr. 30, 2020 and entitled "Heating Control Method and Cooking Apparatus," the entire contents of which are herein incorporated by reference.

FIELD

The present disclosure relates to the field of electrical appliances, and particularly to a cooking apparatus, a control method thereof, a computer readable storage medium, a server, and a heating control method.

BACKGROUND

For most of existing cooking apparatuses, an NTC (Negative Temperature Coefficient) temperature sensor or thermistor temperature sensor is disposed in a cooking chamber to detect the temperature of the cooking chamber in real time, and operation of a cooking apparatus heating device is controlled to cook food on the basis of a temperature detection result. However, the NTC temperature sensor may only detect the temperature of a space surrounding a mounting position; and there is a greater temperature deviation in the overall cooking chamber, and the detection result of the NTC temperature sensor is non-representative, nonuniform food heating is caused, the phenomenon that parts of the food are burned or undercooked occurs, and the user experience is affected.

SUMMARY

The present disclosure is directed to solve at least one of the above technical problems existing in the prior art or related art.

To this end, it is an object of an aspect of the present disclosure to provide a cooking apparatus.

It is an object of another aspect of the present disclosure to provide a control method for a cooking apparatus.

It is an object of another aspect of the present disclosure to provide a computer readable storage medium.

It is an object of another aspect of the present disclosure to provide a control method for a cooking apparatus.

It is an object of another aspect of the present disclosure to provide a control method for a cooking apparatus.

It is an object of another aspect of the present disclosure to provide a cooking apparatus.

It is an object of another aspect of the present disclosure to provide a control method for a cooking apparatus.

It is an object of another aspect of the present disclosure to provide a server.

It is an object of another aspect of the present disclosure to provide a computer readable storage medium.

It is an object of another aspect of the present disclosure to provide a heating control method.

It is an object of another aspect of the present disclosure to provide a cooking apparatus.

To this end, according to a first aspect of the present disclosure, provided is a cooking apparatus including heating devices and multiple heating regions, any one of the heating regions is provided with a heating device, a memory, and a processor, the memory stores a computer program, and the processor is used to, when executing the computer program: acquire image information of food in the cooking apparatus; identify the image information, and acquire a food type and a cooking doneness of food corresponding to any one of the heating regions; and control, according to the food type and the cooking doneness of the food, operation of the heating device in the corresponding heating region.

The cooking apparatus provided in the present disclosure is provided with the multiple heating regions, each of the heating regions is provided with a heating device, and therefore, the detection range of the image information is wide, image information of food corresponding to the multiple heating regions may be captured, the food type and the cooking doneness of the food corresponding to the heating regions (namely the cooking doneness of the food in any one of the heating regions) may be acquired by identifying the acquired image information, and further, the operation of the heating device in the corresponding heating region is controlled according to the food type and the cooking doneness of the food. The heating of food is controlled by cooking region on the basis of the food type and the cooking doneness of the food, thereby achieving uniform food heating, providing a consistent overall cooking doneness, preventing parts of the food from being burned or undercooked, and improving the cooking performance. For example, if it is determined, by identifying the image information, that the cooking doneness of food corresponding to a certain heating region is lower than that in other heating regions, the heating device in this heating region is controlled to heat the food at higher power and/or continuously heat the food; and if it is determined that the cooking doneness of food corresponding to another heating region is higher than that in other heating regions, the heating device in this heating region is controlled to reduce the heating power and/or shorten the heating time, thereby preventing parts of the food from being burned or undercooked.

Specifically, when food is cooked by using the cooking apparatus in the present disclosure, the operation of the heating devices is controlled on the basis of the food type and the cooking doneness of the food, operation manners of the heating devices may be independent of the amount of the food, and therefore, a cooking user of the cooking apparatus in the present disclosure is not limited to use the constant quantity of food material on the basis of a built-in menu adapting to cooking, and the food material may be randomly added as required, by which the same good cooking performance may be achieved.

In addition, the above cooking apparatus according to the present disclosure may further have the following technical features.

In the above embodiment, further, the processor is used to control, according to the food type and the cooking doneness of the food, the operation of the heating device in the corresponding heating region specifically includes: acquiring heating parameters according to the food type and the cooking doneness of the food; and controlling, according to the heating parameters, the operation of the heating device in the corresponding heating region.

In this embodiment, the heating parameters are acquired according to the food type and the cooking doneness of the food, and the heating parameters are used as indices for controlling the operation of the heating devices in the corresponding heating regions, and the operation of the heating devices is controlled more reliably and accurately, the cooking apparatus may operate more reliably, and the user experience is improved.

In any one of the above embodiments, further, the heating parameter includes one or any combination of the following items: a heating temperature, heating power and heating duration.

In this embodiment, the heating parameter includes one or any combination of the heating temperature, the heating power and the heating duration. Multiple heating parameters corresponding to the heating regions may be acquired on the basis of food as well as the food type and the cooking doneness of the food corresponding to the different heating regions, and further, the heating power and/or heating duration of the heating devices in the corresponding heating regions may be controlled on the basis of these heating parameters. Therefore, operation manners of the heating devices are better applicable to the food type and the cooking doneness of the food in the heating regions, thereby achieving uniform food heating, providing a consistent overall cooking temperature, preventing parts of the food from being burned or undercooked, and improving the cooking performance.

For example, different heating temperatures are adjusted according to different cooking doneness, and the heating devices in the corresponding heating regions are further controlled according to the adjusted heating temperatures, wherein the heating temperatures may be higher or lower than the current heating temperature.

In any one of the above embodiments, further, the processor is further used to, when executing the computer program: acquire the current heating temperature of any one of the heating regions; and further control, according to the current heating temperature, the operation of the heating device in the corresponding heating region.

In this embodiment, the operation of the heating device in the corresponding heating region is controlled by acquiring the current temperature in the heating region, and by-region control on the basis of food heating is achieved by taking the current temperature corresponding to the heating region, the food type and the cooking doneness of the food corresponding to the heating region as indices for controlling the operation of the heating device, thereby achieving uniform food heating, providing a consistent overall cooking temperature, preventing parts of the food from being burned or undercooked, and improving the cooking performance.

For example, when the heating temperature is adjusted to be 200 DEG C. according to the cooking doneness, that is, the food in the heating region is heated at 200 DEG C., it is possible that the current heating temperature only reaches 150 DEG C., but does not reach 200 DEG C. due to the aging or energy loss of the heating device, at the moment, the heating temperature is further adjusted, that is, readjustment is performed according to the current heating temperature, thereby ensuring the cooking performance of the food.

In any one of the above embodiments, further, the step that the processor is used to acquire the image information of the food in the cooking apparatus specifically includes: acquiring the image information of the food in the cooking apparatus in a cooking process.

In this embodiment, the step of acquiring the image information of the food in the cooking apparatus includes: acquiring the image information of the food in the cooking apparatus in the cooking process. The type and cooking doneness of the food in the cooking process may be acquired while cooking, and the operation manners of the heating devices in the multiple heating regions are further adjusted, and the operation manners of the heating devices may be adjusted in the cooking process of the food, and the cooking performance may be further improved.

Furthermore, a time interval may be set, and the image information of the food in the cooking apparatus is acquired every time when a time interval is reached in a cooking process of the cooking apparatus, and the cooking doneness of the food in the cooking apparatus is acquired, and the operation manners of the heating devices in the multiple heating regions are adjusted at any time.

According to a second aspect of the present disclosure, a control method for a cooking apparatus is provided. The cooking apparatus includes multiple heating regions, any one of the heating regions is provided with a heating device, and the control method includes: acquiring image information of food in the cooking apparatus; identifying the image information, and acquiring a food type and a cooking doneness of food corresponding to any one of the heating regions; and controlling, according to the food type and the cooking doneness of the food, operation of the heating device in the corresponding heating region.

According to the control method for the cooking apparatus in the present disclosure, the heating devices in the multiple heating regions are controlled by identifying the image information of the food, and therefore, the detection range of the image information is wide, image information of food corresponding to the multiple heating regions may be captured, the food type and the cooking doneness of the food corresponding to the heating regions (namely the cooking doneness of the food in any one of the heating regions) may be acquired by identifying the acquired image information, and further, the operation of the heating device in the corresponding heating region is controlled according to the food type and the cooking doneness of the food. The heating of food is controlled by cooking region on the basis of the food type and the cooking doneness of the food, thereby achieving uniform food heating, providing a consistent overall cooking doneness, preventing parts of the food from being burned or undercooked, and improving the cooking performance. For example, if it is determined, by identifying the image information, that the cooking doneness of food corresponding to a certain heating region is lower than that in other heating regions, the heating device in this heating region is controlled to heat the food at higher power and/or continuously heat the food; and if it is determined that the cooking doneness of food corresponding to another heating region is higher than that in other heating regions, the heating device in this heating region is controlled to reduce the heating power and/or shorten the heating time, thereby preventing parts of the food from being burned or undercooked.

Specifically, when food is cooked by using the cooking apparatus in the present disclosure, the operation of the heating devices is controlled on the basis of the food type and the cooking doneness of the food, operation manners of the heating devices may be independent of the amount of the food, and therefore, a cooking user of the cooking apparatus in the present disclosure is not limited to use the constant quantity of food material on the basis of a built-in menu adapting to cooking, and the food material may be randomly added as required, by which the same good cooking performance may be achieved.

In addition, the above control method for the cooking apparatus according to the present disclosure may further have the following technical features.

In the above embodiment, further, the step of controlling, according to the food type and the cooking doneness of the food, operation of the heating device in the corresponding heating region specifically includes: acquiring heating parameters according to the food type and the cooking doneness of the food; and controlling, according to the heating parameters, the operation of the heating device in the corresponding heating region.

In this embodiment, the heating parameters are acquired according to the food type and the cooking doneness of the food, and the heating parameters are used as indices for controlling the operation of the heating devices in the corresponding heating regions, and the operation of the heating devices is controlled more reliably and accurately, the cooking apparatus may operate more reliably, and the user experience is improved.

In any one of the above embodiments, further, the heating parameter includes one or any combination of the following items: a heating temperature, heating power and heating duration.

In this embodiment, the heating parameter includes one or any combination of the heating temperature, the heating power and the heating duration. Multiple heating parameters corresponding to the heating regions may be acquired on the basis of food as well as the food type and the cooking doneness of the food corresponding to the different heating regions, and further, the heating power and/or heating duration of the heating devices in the corresponding heating regions may be controlled on the basis of these heating parameters. Therefore, operation manners of the heating devices are better applicable to the food type and the cooking doneness of the food in the heating regions, thereby achieving uniform food heating, providing a consistent overall cooking temperature, preventing parts of the food from being burned or undercooked, and improving the cooking performance.

For example, different heating temperatures are adjusted according to different cooking doneness, and the heating devices in the corresponding heating regions are further controlled according to the adjusted heating temperatures, wherein the heating temperatures may be higher or lower than the current heating temperature.

In any one of the above embodiments, further, after the step of controlling, according to the food type and the cooking doneness of the food, operation of the heating device in the corresponding heating region, the control method further includes: acquiring the current heating temperature of any one of the heating regions; and further controlling, according to the current heating temperature, the operation of the heating device in the corresponding heating region.

In this embodiment, the operation of the heating device in the corresponding heating region is controlled by acquiring the current temperature in the heating region, and by-region control on the basis of food heating is achieved by taking the current temperature corresponding to the heating region, the food type and the cooking doneness of the food corresponding to the heating region as indices for controlling the operation of the heating device, thereby achieving uniform food heating, providing a consistent overall cooking temperature, preventing parts of the food from being burned or undercooked, and improving the cooking performance.

For example, when the heating temperature is adjusted to be 200 DEG C. according to the cooking doneness, that is, the food in the heating region is heated at 200 DEG C., it is possible that the current heating temperature only reaches 150 DEG C., but does not reach 200 DEG C. due to the aging or energy loss of the heating device, at the moment, the heating temperature is further adjusted, that is, readjustment is performed according to the current heating temperature, thereby ensuring the cooking performance of the food.

In any one of the above embodiments, further, the step of acquiring the image information of the food in the cooking apparatus specifically includes: acquiring the image information of the food in the cooking apparatus in a cooking process.

In this embodiment, the step of acquiring the image information of the food in the cooking apparatus includes: acquiring the image information of the food in the cooking apparatus in the cooking process. The type and cooking doneness of the food in the cooking process may be acquired while cooking, and the operation manners of the heating devices in the multiple heating regions are further adjusted, and the operation manners of the heating devices may be adjusted in the cooking process of the food, and the cooking performance may be further improved.

Furthermore, a time interval may be set, and the image information of the food in the cooking apparatus is acquired every time when a time interval is reached in a cooking process of the cooking apparatus, and the cooking doneness of the food in the cooking apparatus is acquired, and the operation manners of the heating devices in the multiple heating regions are adjusted at any time.

According to a third aspect of the present disclosure, a computer readable storage medium is provided. When a computer program is executed by a processor, the steps of the control method for the cooking apparatus according to any one of the above embodiments are implemented.

According to the computer readable storage medium provided in the present disclosure, when the computer program is executed by a processor, the steps of the control method for the cooking apparatus according to any one of the above embodiments are implemented, and therefore, the computer readable storage medium has all the beneficial effects of the control method for the cooking apparatus.

To this end, according to a fourth aspect of the present disclosure, the present disclosure provides a control method for a cooking apparatus, including: acquiring image information of a cooked food material; dividing the image information of the cooked food material into multiple regions according to pixel information in the image information of the cooked food material; and selecting a target operation mode according to a comparison result of a color difference value of any two regions and a first color difference threshold, and controlling heating devices of the cooking apparatus to operate according to the target operation mode.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Meanwhile, by comparing the color difference value of any two regions with the first color difference threshold, it may be determined whether the currently cooked food material is heated uniformly, and then, the operation states of the heating devices of the cooking apparatus are controlled, in such a process, it is ensured that the cooked food material is heated uniformly, and the cooking performance is improved.

In addition, the control method for the cooking apparatus according to the above embodiment provided in the present disclosure may further have the following additional technical features.

In the above embodiment, the step of selecting the target operation mode according to the comparison result of the color difference value of any two regions and the first color difference threshold, and controlling the heating devices of the cooking apparatus to operate according to the target operation mode specifically includes: determining that the color difference value of any two regions is smaller than or equal to the first color difference threshold, and controlling the heating devices to further operate according to the current operation mode; and determining that the color difference value of any two regions is greater than the first color difference threshold, and controlling the heating devices to operate according to a by-region heating mode.

In this embodiment, when the color difference value of any two regions is smaller than or equal to the first color difference threshold, it is determined that the cooked food material is heated more uniformly, at the moment, the heating devices are controlled to further operate according to the current operation mode to further heat the cooked food material, thereby completing cooking. When the color difference value of any two regions is greater than the first color difference threshold, it is determined that the cooked food material is heated nonuniformly, and the heating devices are controlled to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

In any one of the above embodiments, the step of dividing the image information of the cooked food material into the multiple regions according to the pixel information in the image information of the cooked food material specifically includes: determining contour information of the cooked food material according to the image information of the cooked food material; acquiring the pixel information of the cooked food material according to the contour information of the cooked food material; dividing any two pieces of pixel information of which a color difference value is smaller than or equal to a second color difference threshold into the same region; and dividing any two pieces of pixel information of which a color difference value is greater than the second color difference threshold into different regions; wherein the second color difference threshold is smaller than the first color difference threshold.

In this embodiment, in order to avoid increasing the heating nonuniformity of heated regions when the heating devices operate according to the by-region heating mode, the regions are divided according to the heating nonuniformity during region division, and thus, the above situation is avoided. Specifically, the image information of the cooked food material is subjected to region division according to a comparison result of a color difference value of any two pieces of pixel information and a second color difference threshold, and any two pieces of pixel information of which a color difference value is smaller than or equal to the second color difference threshold are divided into the same region; and any two pieces of pixel information of which a color difference value is greater than the second color difference threshold are divided into different regions. Due to the division performed by adopting the above manner, it is ensured that the same region is heated uniformly, and then, the cooking performance is ensured.

The second color difference threshold is smaller than the first color difference threshold to ensure that the image information of the cooked food material may be divided into the different regions.

In any one of the above embodiments, multiple heating devices are provided. The step of determining that the color difference value of any two regions is greater than the first color difference threshold, and controlling the heating devices to operate according to the by-region heating mode specifically includes: determining a first heating device corresponding to a region having a greater gray or chromatic value in any two regions and a second heating device corresponding to a region having a smaller gray or chromatic value in any two regions; reducing the power of the first heating device; and/or increasing the power of the second heating device.

In this embodiment, the multiple heating devices are provided, and therefore, the heating devices corresponding to regions to be heated are firstly determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

In any one of the above embodiments, at least two types of heating devices are provided. The step of determining that the color difference value of any two regions is greater than the first color difference threshold, and controlling the heating devices to operate according to the by-region heating mode specifically includes: determining a first-type heating device corresponding to a region having a greater gray or chromatic value in any two regions and a second-type heating device corresponding to a region having a smaller gray or chromatic value in any two regions; controlling the first-type heating device to stop operating or reducing the power of the first-type heating device; and/or controlling the second-type heating device to operate or increasing the power of the second-type heating device.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In any one of the above embodiments, before the step of selecting the target operation mode according to the comparison result of the color difference value of the any two regions and the first color difference threshold, and controlling the heating devices of the cooking apparatus to operate according to the target operation mode, the control method further includes: determining the cooked food material according to the image information of the cooked food material; and controlling the heating devices to operate according to an operation mode corresponding to the cooked food material.

In this embodiment, the control method further includes: determining the cooked food material according to the image information of the cooked food material; and controlling the heating devices to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

In any one of the above embodiments, the control method further includes: determining the first color difference threshold according to the cooked food material.

In this embodiment, the first color difference threshold is determined according to the cooked food material. Compared with the embodiment that all cooked food materials adopt the same first color difference threshold, the present embodiment has the advantages that the probability of poorer cooking performance caused by mismatching between the first color difference threshold and the cooked food material is reduced, and the cooking performance is ensured.

According to a fifth aspect of the present disclosure, the present disclosure provides a control method for a cooking apparatus, including: acquiring image information of a cooked food material; sending the image information of the cooked food material to a server, and the server divides the image information of the cooked food material into multiple regions according to pixel information in the image information of the cooked food material; sending a control instruction according to a comparison result of a color difference value of any two regions and a first color difference threshold; and receiving the control instruction, and controlling heating devices of the cooking apparatus to operate according to an operation mode indicated by the control instruction.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Since the control instruction is generated by comparing the color difference value of any two regions with the first color difference threshold, it represents the heating uniformity of the cooked food material, and when the heating devices of the cooking apparatus operate according to the operation mode indicated by the control instruction, it is ensured that the cooked food material is heated uniformly, and the cooking performance is improved.

In addition, the division of the image information of the cooked food material and the generation of the control instruction are achieved by the server, and therefore, the hardware requirements, such as storage space, Hash rate, etc., on the cooking apparatus may be lowered, and then, the cost of the cooking apparatus is convenient to control.

In addition, the control method for the cooking apparatus according to the above embodiment provided in the present disclosure may further have the following additional technical features.

In the above embodiment, the control instruction includes a first control instruction or a second control instruction. The step of receiving the control instruction, and controlling the heating devices of the cooking apparatus to operate according to the operation mode indicated by the control instruction specifically includes: determining that the first control instruction is received, and controlling the heating devices to further operate according to the current operation mode; and determining that the second control instruction is received, and controlling the heating devices to operate according to a by-region heating mode.

In this embodiment, the control instruction is generated by comparing the color difference value of any two regions with the first color difference threshold. When the color difference value of any two regions is smaller than or equal to the first color difference threshold, it is determined that the cooked food material is heated relatively uniformly, the server generates the first control instruction, and after receiving the first control instruction, the cooking apparatus controls the heating devices to further operate according to the current operation mode to further heat the cooked food material, thereby completing cooking. When the color difference value of any two regions is greater than the first color difference threshold, it is determined that the cooked food material is heated nonuniformly, the server generates the second control instruction, after receiving the second control instruction, the cooking apparatus controls the heating devices to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

In any one of the above embodiments, multiple heating devices are provided. The step of determining that the second control instruction is received, and controlling the heating devices to operate according to the by-region heating mode specifically includes: in response to the second control instruction, determining a first heating device corresponding to a region having a greater gray or chromatic value in any two regions and a second heating device corresponding to a region having a smaller gray or chromatic value in any two regions; reducing the power of the first heating device; and/or increasing the power of the second heating device.

In this embodiment, the multiple heating devices are provided, and therefore, the heating devices corresponding to regions to be heated are first determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

In any one of the above embodiments, at least two types of heating devices are provided. The step of determining that the second control instruction is received, and controlling the heating devices to operate according to the by-region heating mode specifically includes: in response to the second control instruction, determining a first-type heating device corresponding to a region having a greater gray or chromatic value in any two regions and a second-type heating device corresponding to a region having a smaller gray or chromatic value in any two regions; controlling the first-type heating device to stop operating or reducing the power of the first-type heating device; and/or controlling the second-type heating device to operate or increasing the power of the second-type heating device.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In any one of the above embodiments, the control method further includes: in response to a third control instruction, controlling the heating devices to operate according to an operation mode corresponding to the cooked food material.

In this embodiment, the server further determines the cooked food material according to the image information of the cooked food material and sends the third control instruction to the cooking apparatus to control the heating devices to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

According to a sixth aspect of the present disclosure, the present disclosure provides a cooking apparatus including: a body, wherein the body is configured to accommodate a cooked food material; heating devices, wherein the heating devices are configured to heat the cooked food material; an image acquisition device, wherein the image acquisition device is configured to acquire image information of the cooked food material; a memory, wherein the memory stores a computer program; and a controller, wherein the controller executes the computer program to implement the steps of the control method for the cooking apparatus according to any one of the above embodiments.

According to a seventh aspect of the present disclosure, the present disclosure provides a cooking apparatus. A controller in the cooking apparatus executes a computer program to implement the steps of the control method for the cooking apparatus according to any one of the embodiments in the fourth and fifth aspects, and therefore, the cooking apparatus according to the embodiment of the present disclosure has all the beneficial effects of the control method for the cooking apparatus according to any one of the embodiments in the fourth and fifth aspects, which are not enumerated one by one herein.

According to an eighth aspect of the present disclosure, the present disclosure provides a control method for a cooking apparatus, including: receiving image information of a cooked food material; dividing the image information of the cooked food material into multiple regions according to pixel information in the image information of the cooked food material; and sending a control instruction according to a comparison result of a color difference value of any two regions and a first color difference threshold, and heating devices of the cooking apparatus operate according to an operation mode indicated by the control instruction.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Since the control instruction is generated by comparing the color difference value of any two regions with the first color difference threshold, it represents the heating uniformity of the cooked food material, and when the heating devices of the cooking apparatus operate according to the operation mode indicated by the control instruction, it is ensured that the cooked food material is heated uniformly, and the cooking performance is improved.

In addition, the division of the image information of the cooked food material and the generation of the control instruction are achieved by a server, and therefore, the hardware requirements, such as storage space, Hash rate, etc., on the cooking apparatus may be lowered, and then, the cost of the cooking apparatus is convenient to control.

In addition, the control method for the cooking apparatus according to the above embodiment provided in the present disclosure may further have the following additional technical features.

In the above embodiment, the control instruction includes a first control instruction or a second control instruction. The step of sending the control instruction according to the comparison result of the color difference value of any two regions and the first color difference threshold, and the heating devices of the cooking apparatus operate according to the operation mode indicated by the control instruction specifically includes: determining that the color difference value of any two regions is smaller than or equal to the first color difference threshold, and sending the first control instruction, and the cooking apparatus controls the heating devices to further operate according to the current operation mode; and determining that the color difference value of any two regions is greater than the first color difference threshold, and sending the second control instruction, and the cooking apparatus controls the heating devices to operate according to a by-region heating mode.

In this embodiment, the control instruction is generated by comparing the color difference value of any two regions with the first color difference threshold. When the color difference value of any two regions is smaller than or equal to the first color difference threshold, it is determined that the cooked food material is heated relatively uniformly, the server generates the first control instruction, and after receiving the first control instruction, the cooking apparatus controls the heating devices to further operate according to the current operation mode to further heat the cooked food material, thereby completing cooking. When the color difference value of any two regions is greater than the first color difference threshold, it is determined that the cooked food material is heated nonuniformly, the server generates the second control instruction, after receiving the second control instruction, the cooking apparatus controls the heating devices to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

In any one of the above embodiments, multiple heating devices are provided. The step of sending the second control instruction, and the cooking apparatus controls the heating devices to operate according to the by-region heating mode specifically includes: sending the second control instruction, and the cooking apparatus determines a first heating device corresponding to a region having a greater gray or chromatic value in any two regions and a second heating device corresponding to a region having a smaller gray or chromatic value in any two regions; reducing the power of the first heating device; and/or increasing the power of the second heating device.

In this embodiment, the multiple heating devices are provided, and therefore, the heating devices corresponding to regions to be heated are first determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

In any one of the above embodiments, at least two types of heating devices are provided. The step of sending the second control instruction, and the cooking apparatus controls the heating devices to operate according to the by-region heating mode specifically includes: sending the second control instruction, and the cooking apparatus determines a first-type heating device corresponding to a region having a greater gray or chromatic value in any two regions and a second-type heating device corresponding to a region having a smaller gray or chromatic value in any two regions; controlling the first-type heating device to stop operating or reducing the power of the first-type heating device; and/or controlling the second-type heating device to operate or increasing the power of the second-type heating device.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In any one of the above embodiments, the control method further includes: determining the cooked food material according to the image information of the cooked food material; and sending a third control instruction, and the controlling apparatus controls the heating devices to operate according to an operation mode corresponding to the cooked food material.

In this embodiment, the server further determines the cooked food material according to the image information of the cooked food material and sends the third control instruction to the cooking apparatus to control the heating devices to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

In any one of the above embodiments, the control method further includes: determining the first color difference threshold according to the cooked food material.

In this embodiment, the first color difference threshold is determined according to the cooked food material. Compared with the embodiment that all cooked food materials adopt the same first color difference threshold, the present embodiment has the advantages that the probability of poorer cooking performance caused by mismatching between the first color difference threshold and the cooked food material is reduced, and the cooking performance is ensured.

In any one of the above embodiments, the step of dividing the image information of the cooked food material into the multiple regions according to the pixel information in the image information of the cooked food material specifically includes: determining contour information of the cooked food material according to the image information of the cooked food material; acquiring the pixel information of the cooked food material according to the contour information of the cooked food material; dividing any two pieces of pixel information of which a color difference value is smaller than or equal to a second color difference threshold into the same region; and dividing any two pieces of pixel information of which a color difference value is greater than the second color difference threshold into different regions; wherein the second color difference threshold is smaller than the first color difference threshold.

In this embodiment, in order to avoid increasing the heating nonuniformity of heated regions when the heating devices operate according to the by-region heating mode, the regions are divided according to the heating nonuniformity during region division, and thus, the above situation is avoided. Specifically, the image information of the cooked food material is subjected to region division according to a comparison result of a color difference value of any two pieces of pixel information and a second color difference threshold, and any two pieces of pixel information of which a color difference value is smaller than or equal to the second color difference threshold are divided into the same region; and any two pieces of pixel information of which a color difference value is greater than the second color difference threshold are divided into different regions. Due to the division performed by adopting the above manner, it is ensured that the same region is heated uniformly, and then, the cooking performance is ensured.

The second color difference threshold is smaller than the first color difference threshold to ensure that the image information of the cooked food material may be divided into the different regions.

According to a ninth aspect of the present disclosure, the present disclosure provides a server including: a memory configured to store an executable instruction; and a processor configured to execute the stored instruction to implement the steps of the control method for the cooking apparatus according to any one of the embodiments in the eighth aspect.

According to a tenth aspect of the present disclosure, the present disclosure provides a server including: a memory and a processor, wherein the processor executes an instruction stored in the memory to implement the steps of the control method for the cooking apparatus according to any one of the embodiments in the eighth aspect, and therefore, the server provided in the present disclosure has all the beneficial effects of the control method for the cooking apparatus according to any one of the embodiments in the eighth aspect, which are not enumerated one by one herein.

According to an eleventh aspect of the present disclosure, the present disclosure provides a computer readable storage medium storing a computer program, wherein when the computer program is executed, the steps of the control method for the cooking apparatus according to any one of the above embodiments are implemented, and therefore, the computer readable storage medium according to the embodiment of the present disclosure has all the beneficial effects of the control method for the cooking apparatus according to any one of the above embodiments, which are not enumerated one by one herein.

To this end, an embodiment of the present disclosure provides a heating control method and a cooking apparatus to improve the food heating uniformity.

The heating control method according the embodiment in a twelfth aspect of the present disclosure is applied to a cooking apparatus and includes:

controlling a storage device of the cooking apparatus to rotate according to a first angular speed, and controlling a heating element of the cooking apparatus to heat according to first heating power;

acquiring images of different regions on the surface of food, wherein the food is located on the storage device;

calculating a color difference value of food regions in a first image corresponding to the current region and a second image corresponding to other regions, wherein other regions refer to any regions except the current region on the surface of the food, and the first image and the second image are acquired within a preset rotation angle range of the storage device; and determining, according to the color difference value and a preset color difference threshold, whether the first angular speed and/or the first heating power is adjusted.

In some embodiments, the step of acquiring the images of the different regions on the surface of the food includes:

continuously acquiring, according to a condition for acquisition after the storage device rotates for a first preset angle, the images of the food on the storage device to obtain the images corresponding to the different regions on the surface of the food.

In some embodiments, the step of acquiring the images of the different regions on the surface of the food includes:

acquiring the images of the food on the storage device in real time, and acquiring the images corresponding to the different regions on the surface of the food according to a preset condition;

the preset condition includes: every time when the storage device rotates at a second preset angle, or every time when the storage device rotates for a preset time interval.

In some embodiments, before the step of controlling the storage device of the cooking apparatus to rotate according to the first angular speed, and controlling the heating element of the cooking apparatus to heat according to the first heating power, the method further includes:

analyzing a food type of the food on the storage device; and acquiring the first angular speed and the first heating power according to a correspondence between the food type and a heating condition.

In some embodiments, the step of calculating the color difference value of the food regions in the first image corresponding to the current region and the second image corresponding to other regions includes:

recognizing a contour of a food region in each image;

uniformly acquiring a preset number of pixel points in the contour; and calculating a color difference value of the pixel points acquired in the first image corresponding to the current region and the second image corresponding to other regions.

In some embodiments, the step of calculating the color difference value of the pixel points acquired in the first image corresponding to the current region and the second image corresponding to other regions includes:

calculating, on the basis of an HSV color space, the color difference value of the pixel points acquired in the first image corresponding to the current region and the second image corresponding to other regions.

In some embodiments, the step of determining, according to the color difference value and the preset color difference threshold, whether the first angular speed is adjusted includes:

if the color difference value is between the minimum color difference threshold and the maximum color difference threshold, maintaining the first angular speed;

if the color difference value is smaller than the minimum color difference threshold, adjusting the first angular speed to a second angular speed, wherein the second angular speed is smaller than the first angular speed; and if the color difference value is greater than the maximum color difference threshold, adjusting the first angular speed to a third angular speed, wherein the third angular speed is greater than the first angular speed.

In some embodiments, the step of determining, according to the color difference value and the preset color difference threshold, whether the first heating power is adjusted includes:

if the color difference value is between the minimum color difference threshold and the maximum color difference threshold, maintaining the first heating power;

if the color difference value is smaller than the minimum color difference threshold, adjusting the first heating power to second heating power, wherein the second heating power is greater than the first heating power; and if the color difference value is greater than the maximum color difference threshold, adjusting the first heating power to third heating power, wherein the third heating power is smaller than the first heating power.

A cooking apparatus according to an embodiment in a thirteenth aspect of the present disclosure includes:

a control unit used to control a storage device of the cooking apparatus to rotate according to a first angular speed, and control a heating element of the cooking apparatus to heat according to first heating power;

an image acquisition unit used to acquire images of different regions on the surface of food, wherein the food is located on the storage device; and an image processing unit used to calculate a color difference value of food regions in a first image corresponding to the current region and a second image corresponding to other regions, wherein other regions refer to any regions except the current region on the surface of the food, and the first image and the second image are acquired within a preset rotation angle range of the storage device; wherein the control unit is further used to determine, according to the color difference value and a preset color difference threshold, whether the first angular speed and/or the first heating power is adjusted.

In some embodiments, the image processing unit is specifically used to continuously acquire, according to a condition for acquisition after the storage device rotates for a first preset angle, the images of the food on the storage device to obtain the images corresponding to the different regions on the surface of the food.

In some embodiments, the image processing unit is specifically used to acquire the images of the food on the storage device in real time, and acquire the images corresponding to the different regions on the surface of the food according to a preset condition; and the preset condition includes: every time when the storage device rotates at a second preset angle, or every time when the storage device rotates for a preset time interval.

In some embodiments, the cooking apparatus further includes:

an acquisition unit used to, before the control unit controls the storage device of the cooking apparatus to rotate according to the first angular speed, and controls the heating element of the cooking apparatus to heat according to the first heating power, analyze a food type of the food on the storage device; and acquire the first angular speed and the first heating power according to a correspondence between the food type and a heating condition.

In some embodiments, the image processing unit is specifically used to:

recognize a contour of a food region in each image;

uniformly acquire a preset number of pixel points in the contour; and calculate a color difference value of the pixel points acquired in the first image corresponding to the current region and the second image corresponding to other regions.

In some embodiments, the image processing unit is used to calculate, on the basis of an HSV color space, the color difference value of the pixel points acquired in the first image corresponding to the current region and the second image corresponding to other regions.

In some embodiments, the control unit is specifically used to:

If the color difference value is between the minimum color difference threshold and the maximum color difference threshold, maintain the first angular speed;

If the color difference value is smaller than the minimum color difference threshold, adjust the first angular speed to a second angular speed, wherein the second angular speed is smaller than the first angular speed; and If the color difference value is greater than the maximum color difference threshold, adjust the first angular speed to a third angular speed, wherein the third angular speed is greater than the first angular speed.

In some embodiments, the control unit is specifically used to:

If the color difference value is between the minimum color difference threshold and the maximum color difference threshold, maintain the first heating power;

If the color difference value is smaller than the minimum color difference threshold, adjust the first heating power to second heating power, wherein the second heating power is greater than the first heating power; and If the color difference value is greater than the maximum color difference threshold, adjust the first heating power to third heating power, wherein the third heating power is smaller than the first heating power.

In this solution, both of the angular speed of the rotation of the storage device and the heating power of the heating element are adjustable. A heating state of the food is determined by means of colors of heated regions at different angles of the food, the heating time and intensity in different heated regions at different angles of the food are controlled by controlling the angular speed of the rotation of the storage device, and thus, the heating uniformity of the food is effectively improved.

Additional aspects and advantages of the present disclosure will be apparent from the description which follows, or may be learned by practice of the present disclosure.

BRIEF DESCRIPTION OF THE DRAWINGS

The above and/or additional aspects and advantages of the present disclosure will be apparent from and elucidated in combination with the embodiments described hereinafter with reference to the accompanying drawings, in which:

Wherein the correspondence between reference numerals and component names in FIG. 1 and FIG. 2 is:

100 cooking apparatus, 110 memory, 120 processor, 130 heating device, 140 heating region, 132 first heating tube, 134 second heating tube, 136, third heating tube, 138 fourth heating tube, 142 first heating region, and 144 second heating region.

DETAILED DESCRIPTION OF THE DISCLOSURE

In order to understand the above-mentioned objects, features and advantages of the present disclosure more clearly, the present disclosure will be described in further detail with reference to the accompanying drawings and specific implementations. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein, and therefore, the protection scope of the present disclosure is not limited to the specific embodiments disclosed below.

A cooking apparatus, a control method thereof, and a computer readable storage medium according to some embodiments of the present disclosure will now be described with reference to FIGS. 1 to 6.

Embodiment 1

Figure 1:
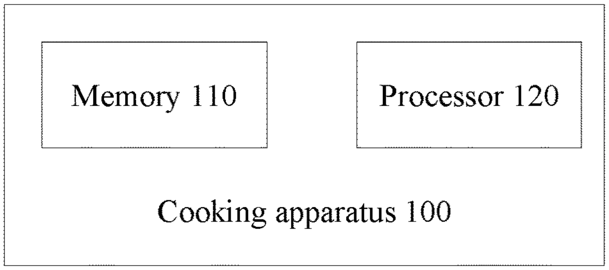
FIG. 1 shows a schematic structural diagram of a cooking apparatus according to an embodiment of the present disclosure.
Figure 2:
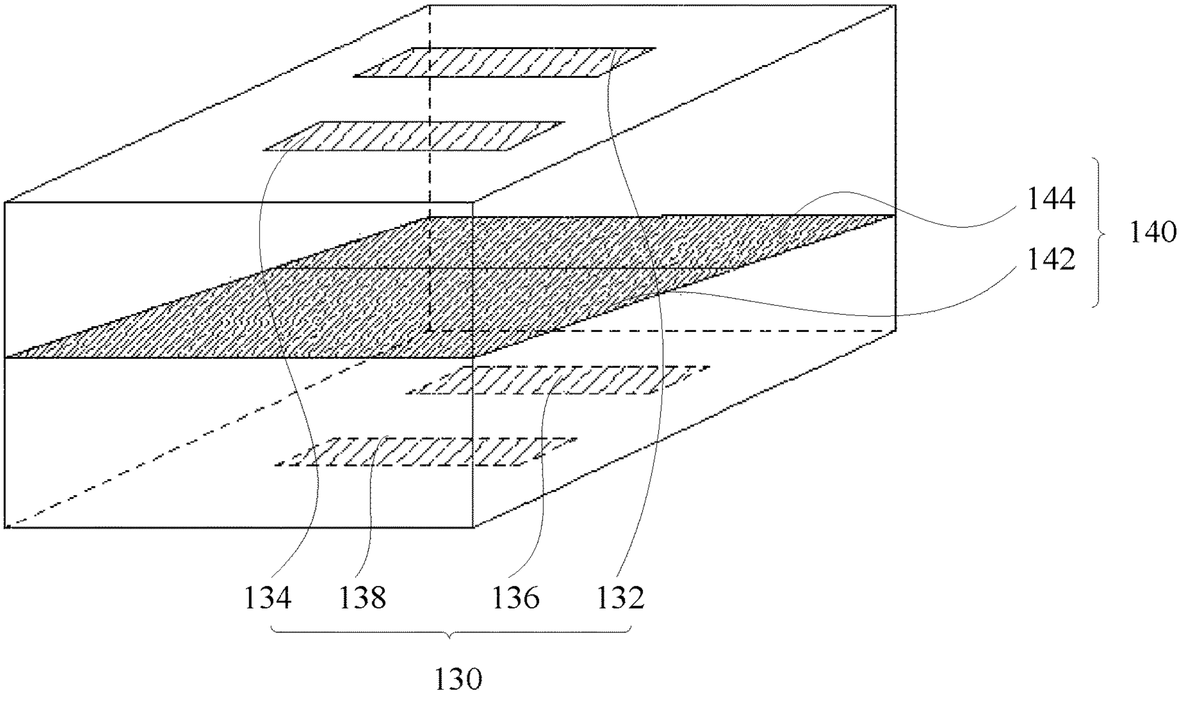
FIG. 2 shows a schematic structural diagram of heating devices and heating regions according to an embodiment of the present disclosure.

As shown in FIG. 1 and FIG. 2, an embodiment of the present disclosure provides a cooking apparatus 100 including heating devices 130, multiple heating regions 140, a memory 110, and a processor 120.

As shown in FIG. 2, any one of the heating regions 140 is provided with a heating device 130, the memory 110 stores a computer program, and the processor 120 is used to, when executing the computer program: acquire image information of food in the cooking apparatus 100; identify the image information, and acquire a food type and a cooking doneness of food corresponding to any one of the heating regions 140; and control, according to the food type and the cooking doneness of the food, operation of the heating device 130 in the corresponding heating region 140.

The cooking apparatus 100 provided in the present disclosure is provided with the multiple heating regions 140, each of the heating regions 140 is provided with a heating device 130, and therefore, the detection range of the image information is wide, image information of food corresponding to the multiple heating regions 140 may be captured, the food type and the cooking doneness of the food corresponding to the heating regions 140 (namely the cooking doneness of the food in any one of the heating regions) may be acquired by identifying the acquired image information, and further, the operation of the heating device 130 in the corresponding heating region 140 is controlled according to the food type and the cooking doneness of the food. The heating of food is controlled by cooking region on the basis of the food type and the cooking doneness of the food, thereby achieving uniform food heating, providing a consistent overall cooking doneness, preventing parts of the food from being burned or undercooked, and improving the cooking performance. For example, if it is determined, by identifying the image information, that the cooking doneness of food corresponding to a certain heating region 140 is lower than that in other heating regions 140, the heating device 130 in this heating region 140 is controlled to heat the food at higher power and/or continuously heat the food; and if it is determined that the cooking doneness of food corresponding to another heating region 140 is higher than that in other heating regions 140, the heating device 130 in this heating region 140 is controlled to reduce the heating power and/or shorten the heating time, thereby preventing parts of the food from being burned or undercooked.

Specifically, when food is cooked by using the cooking apparatus 100 in the present disclosure, the operation of the heating devices 130 is controlled on the basis of the food type and the cooking doneness of the food, operation manners of the heating devices 130 may be independent of the amount of the food, and therefore, a cooking user of the cooking apparatus 100 in the present disclosure is not limited to use the constant quantity of food material on the basis of a built-in menu adapting to cooking, and the food material may be randomly added as required, by which the same good cooking performance may be achieved.

Embodiment 2

As shown in FIG. 1 and FIG. 2, an embodiment of the present disclosure provides a cooking apparatus 100 including heating devices 130, multiple heating regions 140, a memory 110, and a processor 120.

As shown in FIG. 2, any one of the heating regions 140 is provided with a heating device 130, the memory 110 stores a computer program, and the processor 120 is used to, when executing the computer program: acquire image information of food in the cooking apparatus 100; identify the image information, and acquire a food type and a cooking doneness of food corresponding to any one of the heating regions 140; and control, according to the food type and the cooking doneness of the food, operation of the heating device 130 in the corresponding heating region 140.

Further, the step that the processor 120 is used to control, according to the food type and the cooking doneness of the food, the operation of the heating device 130 in the corresponding heating region 140 specifically includes: heating parameters are acquired according to the food type and the cooking doneness of the food; and the operation of the heating device in the corresponding heating region is controlled according to the heating parameters.

In this embodiment, the heating parameters are acquired according to the food type and the cooking doneness of the food, and the heating parameters are used as indices for controlling the operation of the heating devices 130 in the corresponding heating regions 140, and the operation of the heating devices 130 is controlled more reliably and accurately, and the cooking apparatus 100 may operate more reliably.

Further, the heating parameter includes one or any combination of the following items: a heating temperature, heating power and heating duration.

In this embodiment, the heating parameter includes one or any combination of the heating temperature, the heating power and the heating duration. Multiple heating parameters corresponding to the heating regions 140 may be acquired on the basis of food as well as the food type and the cooking doneness of the food corresponding to the different heating regions 140, and further, the heating power and/or heating duration of the heating devices 130 in the corresponding heating regions 140 may be controlled on the basis of these heating parameters. Therefore, operation manners of the heating devices 130 are better applicable to the food type and the cooking doneness of the food in the heating regions 140, thereby achieving uniform food heating, providing a consistent overall cooking temperature, preventing parts of the food from being burned or undercooked, and improving the cooking performance.

For example, different heating temperatures are adjusted according to different cooking doneness, and the heating devices in the corresponding heating regions are further controlled according to the adjusted heating temperatures, wherein the heating temperatures may be higher or lower than the current heating temperature.

Further, the step that the processor 120 is used to acquire the image information of the food in the cooking apparatus 100 specifically includes: the image information of the food in the cooking apparatus 100 is acquired in a cooking process.

In this embodiment, the step that the image information of the food in the cooking apparatus 100 is acquired includes: the image information of the food in the cooking apparatus 100 is acquired in the cooking process. The type and cooking doneness of the food in the cooking process may be acquired while cooking, and the operation manners of the heating devices 130 in the multiple heating regions 140 are further adjusted, and the operation manners of the heating devices 130 may be adjusted in the cooking process of the food, and the cooking performance may be further improved.

Furthermore, a time interval may be set, and the image information of the food in the cooking apparatus 100 is acquired every time when a time interval is reached in a cooking process of the cooking apparatus 100, and the cooking doneness of the food in the cooking apparatus 100 is acquired, and the operation manners of the heating devices 130 in the multiple heating regions 140 are adjusted at any time.

Embodiment 3

An embodiment of the present disclosure provides a cooking apparatus 100 including heating devices 130, multiple heating regions 140, a memory 110, and a processor 120.

As shown in FIG. 2, any one of the heating regions 140 is provided with a heating device 130, the memory 110 stores a computer program, and the processor 120 is used to, when executing the computer program: acquire image information of food in the cooking apparatus 100; identify the image information, and acquire a food type and a cooking doneness of food corresponding to any one of the heating regions 140; and control, according to the food type and the cooking doneness of the food, operation of the heating device 130 in the corresponding heating region 140.

Further, the processor 120 is further used to, when executing the computer program: acquire the current heating temperature of any one of the heating regions 140; and further control, according to the current heating temperature, the operation of the heating device 130 in the corresponding heating region 140.

In this embodiment, the operation of the heating device 130 in the corresponding heating region 140 is controlled by acquiring the current temperature in the heating region 140, and by-region control on the basis of food heating is achieved by taking the current temperature corresponding to the heating region 140, the food type and the cooking doneness of the food corresponding to the heating region 140 as indices for controlling the operation of the heating device 130, thereby achieving uniform food heating, providing a consistent overall cooking temperature, preventing parts of the food from being burned or undercooked, and improving the cooking performance.

For example, the heating device 130 in the corresponding heating region 140 is controlled to heat the food in this heating region at 200 DEG C. according to the food type and the cooking doneness of the food, however, it is possible that the current heating temperature only reaches 150 DEG C., but does not reach 200 DEG C. due to the aging or energy loss of the heating device 130, at the moment, the heating temperature is further adjusted, that is, readjustment is performed according to the current heating temperature, thereby ensuring the cooking performance of the food.

Embodiment 4

Figure 3:
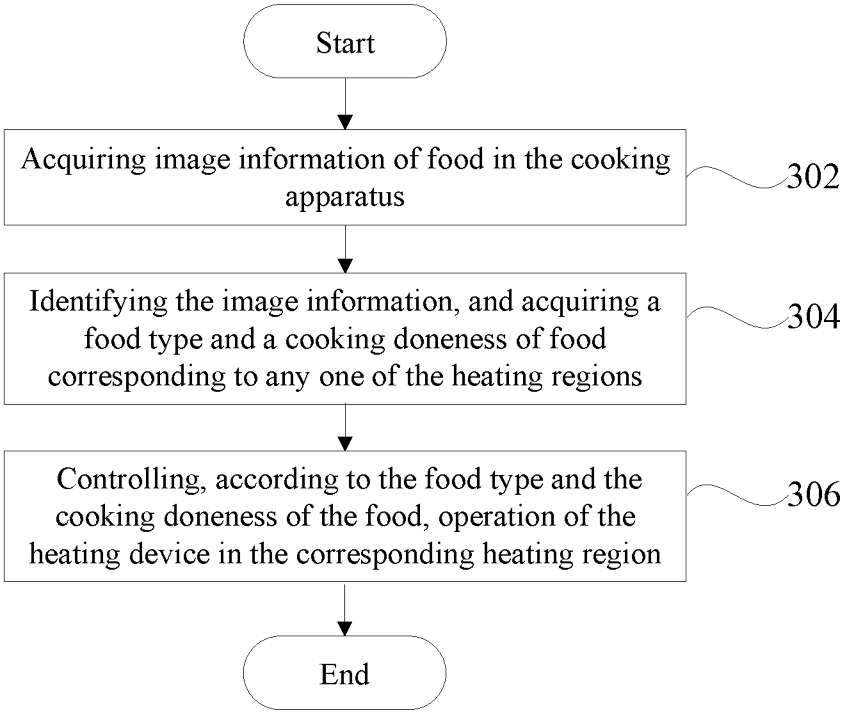
FIG. 3 shows a process diagram of a control method for a cooking apparatus according to embodiment 4 of the present disclosure.

As shown in FIG. 3, an embodiment of the present disclosure provides a control method for a cooking apparatus, wherein the cooking apparatus includes multiple heating regions, and any one of the heating regions is provided with a heating device. The control method includes:

- step 302, image information of food in the cooking apparatus is acquired;
- step 304, the image information is identified, and a food type and a cooking doneness of food corresponding to any one of the heating regions are acquired; and
- step 306, operation of the heating device in the corresponding heating region is controlled according to the food type and the cooking doneness of the food.

According to the control method for the cooking apparatus in the present disclosure, the heating devices in the multiple heating regions are controlled by identifying the image information of the food, and therefore, the detection range of the image information is wide, image information of food corresponding to the multiple heating regions may be captured, the food type and the cooking doneness of the food corresponding to the heating regions may be acquired by identifying the acquired image information, and further, the operation of the heating device in the corresponding heating region is controlled according to the food type and the cooking doneness of the food. The heating of food is controlled by cooking region on the basis of the food type and the cooking doneness of the food, thereby achieving uniform food heating, providing a consistent overall cooking doneness, preventing parts of the food from being burned or undercooked, and improving the cooking performance. For example, if it is determined, by identifying the image information, that the cooking doneness of food corresponding to a certain heating region is lower than that in other heating regions, the heating device in this heating region is controlled to heat the food at higher power and/or continuously heat the food; and if it is determined that the cooking doneness of food corresponding to another heating region is higher than that in other heating regions, the heating device in this heating region is controlled to reduce the heating power and/or shorten the heating time, thereby preventing parts of the food from being burned or undercooked.

Specifically, when food is cooked by using the cooking apparatus in the present disclosure, the operation of the heating devices is controlled on the basis of the food type and the cooking doneness of the food, operation manners of the heating devices may be independent of the amount of the food, and therefore, a cooking user of the cooking apparatus in the present disclosure is not limited to use the constant quantity of food material on the basis of a built-in menu adapting to cooking, and the food material may be randomly added as required, by which the same good cooking performance may be achieved.

Embodiment 5

Figure 4:
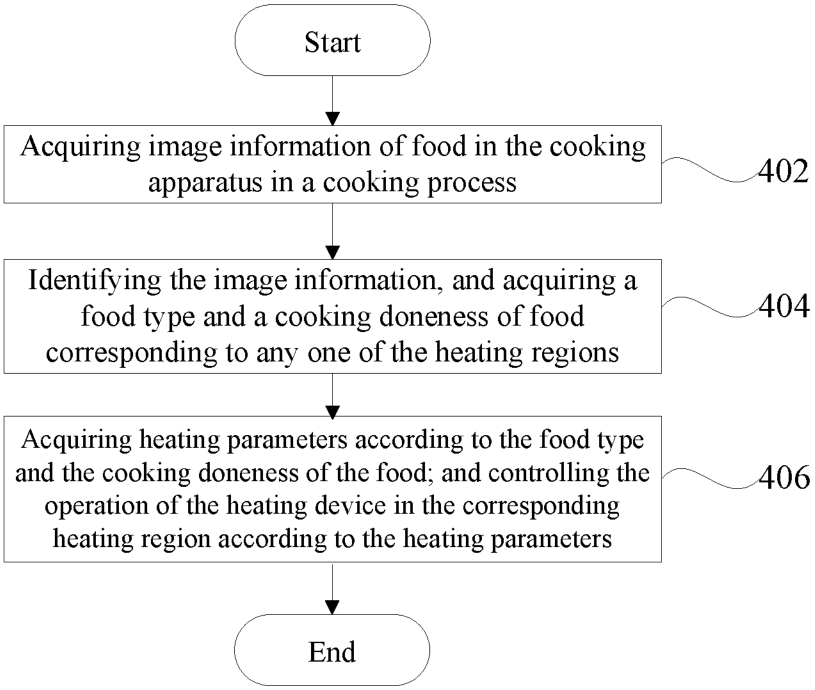
FIG. 4 shows a process diagram of a control method for a cooking apparatus according to embodiment 5 of the present disclosure.

As shown in FIG. 4, an embodiment of the present disclosure provides a control method for a cooking apparatus, wherein the cooking apparatus includes multiple heating regions, and any one of the heating regions is provided with a heating device. The control method includes:

- step 402, image information of food in the cooking apparatus is acquired in a cooking process;
- step 404, the image information is identified, and a food type and a cooking doneness of food corresponding to any one of the heating regions are acquired; and
- step 406, heating parameters are acquired according to the food type and the cooking doneness of the food; and the operation of the heating device in the corresponding heating region is controlled according to the heating parameters.

The heating parameter includes one or any combination of the following items: a heating temperature, heating power and heating duration.

In this embodiment, the heating parameters are acquired according to the food type and the cooking doneness of the food, and the heating parameters are used as indices for controlling the operation of the heating devices in the corresponding heating regions, and the operation of the heating devices is controlled more reliably and accurately, the cooking apparatus may operate more reliably, and the user experience is improved.

In this embodiment, the heating parameter includes one or any combination of the heating temperature, the heating power and the heating duration. Multiple heating parameters corresponding to the heating regions may be acquired on the basis of food as well as the food type and the cooking doneness of the food corresponding to the different heating regions, and further, the heating power and/or heating duration of the heating devices in the corresponding heating regions may be controlled on the basis of these heating parameters. Therefore, operation manners of the heating devices are better applicable to the food type and the cooking doneness of the food in the heating regions, thereby achieving uniform food heating, providing a consistent overall cooking temperature, preventing parts of the food from being burned or undercooked, and improving the cooking performance.

For example, different heating temperatures are adjusted according to different cooking doneness, and the heating devices in the corresponding heating regions are further controlled according to the adjusted heating temperatures, wherein the heating temperatures may be higher or lower than the current heating temperature.

In this embodiment, the step that the image information of the food in the cooking apparatus is acquired includes: the image information of the food in the cooking apparatus is acquired in the cooking process. The type and cooking doneness of the food in the cooking process may be acquired while cooking, and the operation manners of the heating devices in the multiple heating regions are further adjusted, and the operation manners of the heating devices may be adjusted in the cooking process of the food, and the cooking performance may be further improved.

Embodiment 6

Figure 5:
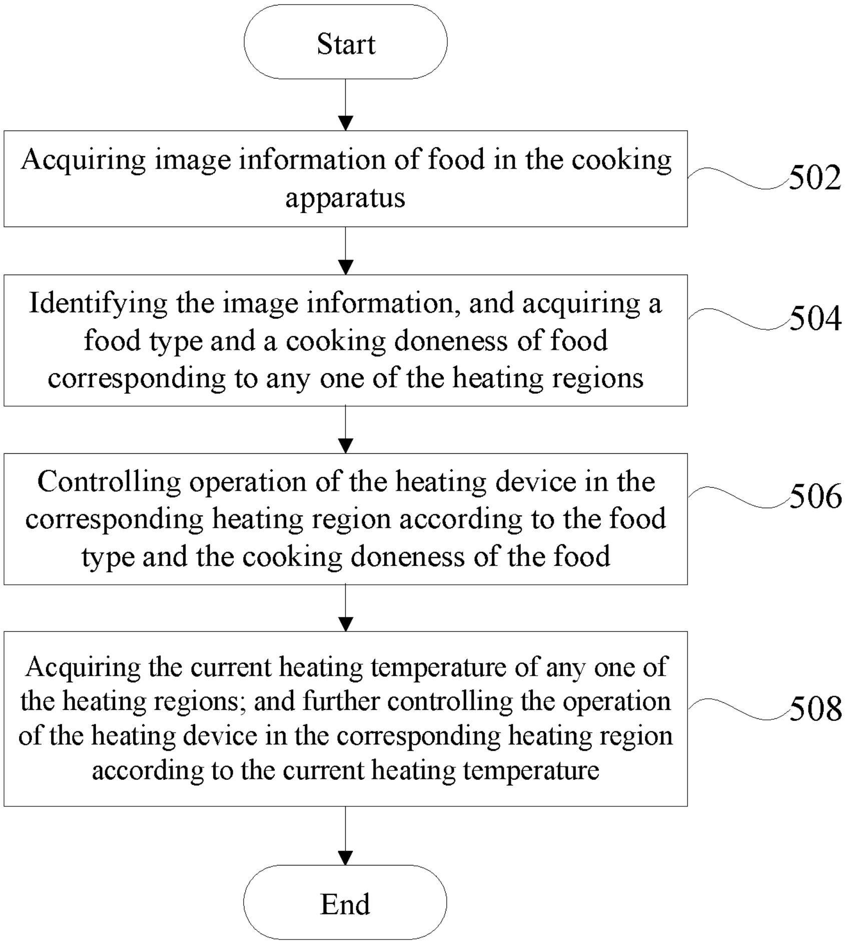
FIG. 5 shows a process diagram of a control method for a cooking apparatus according to embodiment 6 of the present disclosure.

As shown in FIG. 5, an embodiment of the present disclosure provides a control method for a cooking apparatus, wherein the cooking apparatus includes multiple heating regions, and any one of the heating regions is provided with a heating device. The control method includes:

- step 502, image information of food in the cooking apparatus is acquired;
- step 504, the image information is identified, and a food type and a cooking doneness of food corresponding to any one of the heating regions are acquired;
- step 506, operation of the heating device in the corresponding heating region is controlled according to the food type and the cooking doneness of the food; and
- step 508, the current heating temperature of any one of the heating regions is acquired; and the operation of the heating device in the corresponding heating region is further controlled according to the current heating temperature.

In this embodiment, the operation of the heating device in the corresponding heating region is controlled by acquiring the current temperature in the heating region, and by-region control on the basis of food heating is achieved by taking the current temperature corresponding to the heating region, the food type and the cooking doneness of the food corresponding to the heating region as indices for controlling the operation of the heating device, thereby achieving uniform food heating, providing a consistent overall cooking temperature, preventing parts of the food from being burned or undercooked, and improving the cooking performance.

For example, the heating device in the corresponding heating region is controlled to heat the food in this heating region at 200 DEG C. according to the food type and the cooking doneness of the food, however, it is possible that the current heating temperature only reaches 150 DEG C., but does not reach 200 DEG C. due to the aging or energy loss of the heating device, at the moment, the heating temperature is further adjusted, that is, readjustment is performed according to the current heating temperature, thereby ensuring the cooking performance of the food.

Embodiment 7

According to another aspect of the present disclosure, a computer readable storage medium is provided. When a computer program is executed, the steps of the control method for the cooking apparatus according to any one of the above embodiments are implemented.

According to the computer readable storage medium provided in the present disclosure, when the computer program is executed by a processor, the steps of the control method for the cooking apparatus according to any one of the above embodiments are implemented, and therefore, the computer readable storage medium has all the beneficial effects of the control method for the cooking apparatus.

Specific Embodiment

As shown in FIG. 1 and FIG. 2, the present disclosure provides a cooking apparatus 100 including heating devices 130, multiple heating regions 140, a memory 110, and a processor 120.

As shown in FIG. 2, any one of the heating regions 140 is provided with a heating device 130, the memory 110 stores a computer program, and the processor 120 is used to, when executing the computer program: acquire image information of food in the cooking apparatus 100; identify the image information, and acquire a food type and a cooking doneness of food corresponding to any one of the heating regions 140; and control, according to the food type and the cooking doneness of the food, operation of the heating device 130 in the corresponding heating region 140.

In this embodiment, the food type and the cooking doneness of the food in the cooking process are recognized by using an image recognition technology, and the heating devices 130 in the different heating regions 140 are adjusted directionally, and the food is heated uniformly, and the cooking performance is improved.

A system structure of the cooking apparatus 100 includes: 1, an image acquisition device (unshown in the figure) which is used to acquire an image of food and sending the image to the processor 120 of the cooking apparatus to analyze the food type and the current cooking state; 2, the processor 120 which may be a local CUP or remote control center of a server and is used to calculate the food type by database comparison, determine the cooking doneness of food on different positions of the current heating container and send a communication instruction to an execution mechanism; and 3, the execution mechanism (unshown in the figure) which is used to receive identification information sent by the processor 120 of the cooking apparatus and respectively control the heating devices 130 in the corresponding heating regions 140 according to the food type and the cooking doneness on the different positions, wherein the heating devices 130 may be heating tubes, hot-air motors, magnetrons, infrared tubes, etc.

Figure 6:
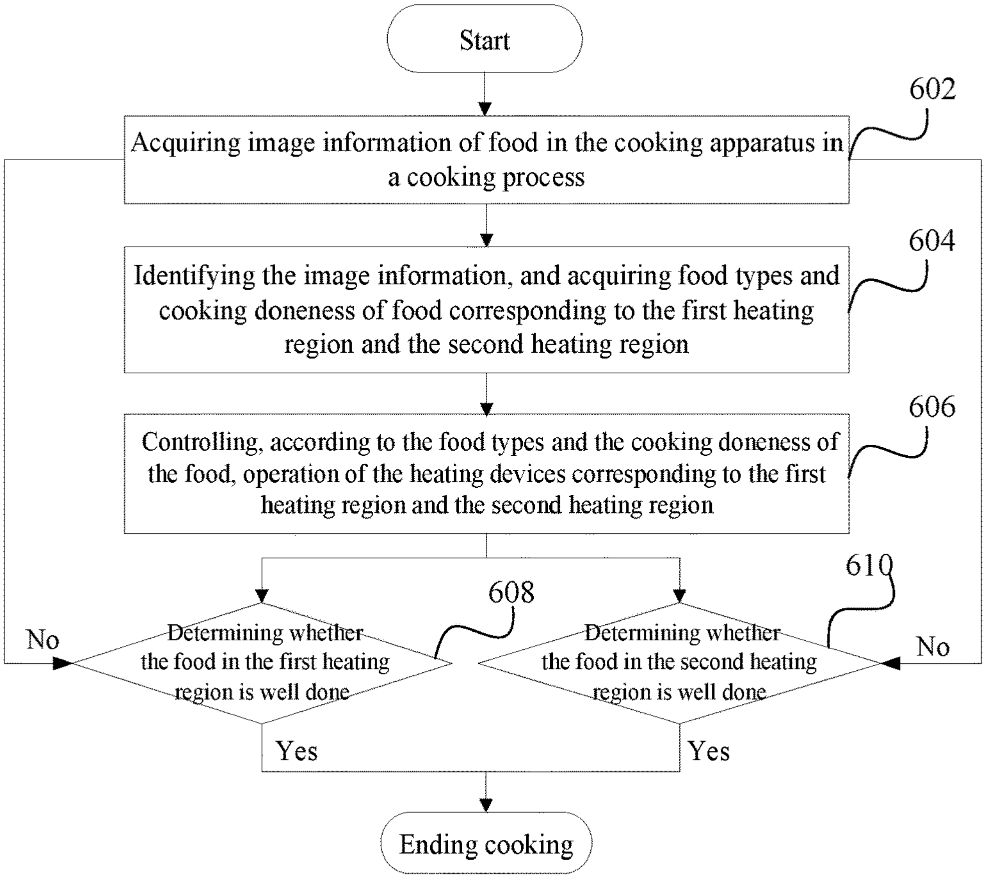
FIG. 6 shows a process diagram of a control method for a cooking apparatus according to a specific implementation of the present disclosure.

As shown in FIG. 2, the cooking apparatus 100 is a baking oven, a baking tray in a cooking region of the baking oven is provided with a first heating region 142 and a second heating region 144, a first heating tube 132 and a second heating tube 134 are disposed in the first heating region 142, a third heating tube 136 and a fourth heating tube 138 are disposed in the second heating region 144, and the heating tubes may be individually controlled. For example, a method of cooking honey coated roast chicken wings, as shown in FIG. 6, may include the following steps.

Step 602, image information of food in the cooking apparatus is acquired in a cooking process.

When a user puts a food material (honey coated roast chicken wings) and starts cooking to heat the food material, the image acquisition device of the cooking apparatus 100 may regularly acquire an image to be uploaded to the processor 120 at the time interval of 10 s.

Step 604, the image information is identified, and food types and cooking doneness of food corresponding to the first heating region and the second heating region are acquired.

The image information is acquired by the processor 120, the type (chicken wings) of the current food material and heating parameters of the different heating regions 140 are analyzed by database comparison, and the cooking doneness of the food material may be divided into six states including uncooked, blue rare, rare, medium, medium well and well done.

Step 606, operation of the heating devices corresponding to the first heating region and the second heating region are controlled according to the food types and the cooking doneness of the food.

If the image information analyzed by the processor 120 shows that the food in the first heating region 142 is medium and the food in the second heating region 144 is medium well, the second heating tube 134 and the fourth heating tube 138 further keep baking at 250 DEG C., and the first heating tube 132 and the third heating tube 136 may keep baking at a lowered temperature of 210 DEG C. until the cooking doneness in the first heating region 142 and the second heating region 144 are consistent.

If the food in the first heating region 142 is in a medium rare state and the food in the second heating region 144 is well done, the second heating tube 134 and the fourth heating tube 138 further keep baking at 250 DEG C., and the first heating tube 132 and the third heating tube 136 stop further heating; and when the food in the both regions are well done, the second heating tube 134 and the fourth heating tube 138 also stop heating, and thus, cooking is ended.

If it is recognized that the chicken wings in the first heating region 142 are completely colored on tops to reach a well done state and are colored on bottoms to reach a medium well state, operation of the second heating tube 134 is stopped, and the fourth heating tube 138 keeps heating at 250 DEG C. until the bottoms are well done.

Step 608, it is determined whether the food in the first heating region 142 is well done, if yes, cooking is ended, if not, the step 602 is performed.

Step 610, it is determined whether the food in the second heating region 144 is well done, if yes, cooking is ended, if not, the step 602 is performed.

In this specific embodiment, the cooking doneness of the food on the different positions of a chamber of the apparatus are recognized in combination with the image to perform corresponding by-region heating control, and thus, on one hand, the problem of temperature nonuniformity caused by single NTC control is solved, and the cooking performance is improved; and on the other hand, the technical defect of poor food cooking performance caused by mismatching between the quantity of the food material and a menu due to the heating of the food material at constant temperature within constant time when the food material is cooked on the basis of the menu by the existing cooking apparatus is overcome. According to this embodiment, the user is not necessarily limited to use the constant quantity of food material, and the food material may be randomly added as required, by which the same good cooking performance may be achieved.

The cooking apparatus related to the embodiment of the present disclosure includes, but is not limited to a baking oven, a steaming oven and a microwave oven.

Embodiment 8

Figure 7:
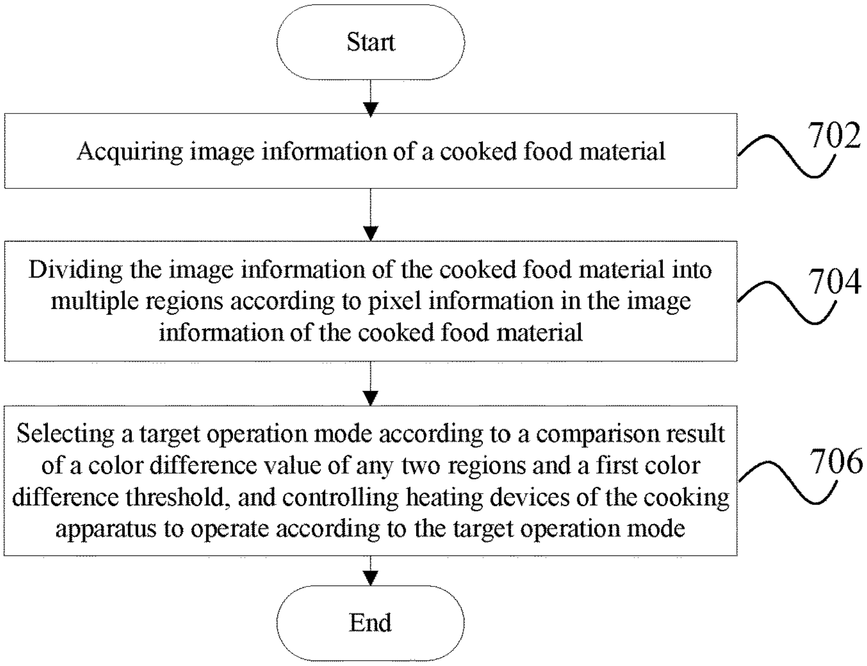
FIG. 7 shows a schematic process diagram of a control method for a cooking apparatus according to an embodiment of the present disclosure.

In an embodiment of the present disclosure, as shown in FIG. 7, the present disclosure provides a control method for a cooking apparatus, including:

- step 702, image information of a cooked food material is acquired;
- step 704, the image information of the cooked food material is divided into multiple regions according to pixel information in the image information of the cooked food material; and
- step 706, a target operation mode is selected according to a comparison result of a color difference value of any two regions and a first color difference threshold, and heating devices of the cooking apparatus are controlled to operate according to the target operation mode.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Meanwhile, by comparing the color difference value of any two regions with the first color difference threshold, it may be determined whether the currently cooked food material is heated uniformly, and then, the operation states of the heating devices of the cooking apparatus are controlled, in such a process, it is ensured that the cooked food material is heated uniformly, and the cooking performance is improved.

In one of the embodiments, the step that the target operation mode is selected according to the comparison result of the color difference value of any two regions and the first color difference threshold, and the heating devices of the cooking apparatus are controlled to operate according to the target operation mode specifically includes: it is determined that the color difference value of any two regions is smaller than or equal to the first color difference threshold, and the heating devices are controlled to further operate according to the current operation mode; and it is determined that the color difference value of any two regions is greater than the first color difference threshold, and the heating devices are controlled to operate according to a by-region heating mode.

In this embodiment, when the color difference value of any two regions is smaller than or equal to the first color difference threshold, it is determined that the cooked food material is heated more uniformly, at the moment, the heating devices are controlled to further operate according to the current operation mode to further heat the cooked food material, thereby completing cooking. When the color difference value of any two regions is greater than the first color difference threshold, it is determined that the cooked food material is heated nonuniformly, and the heating devices are controlled to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

Figure 8:
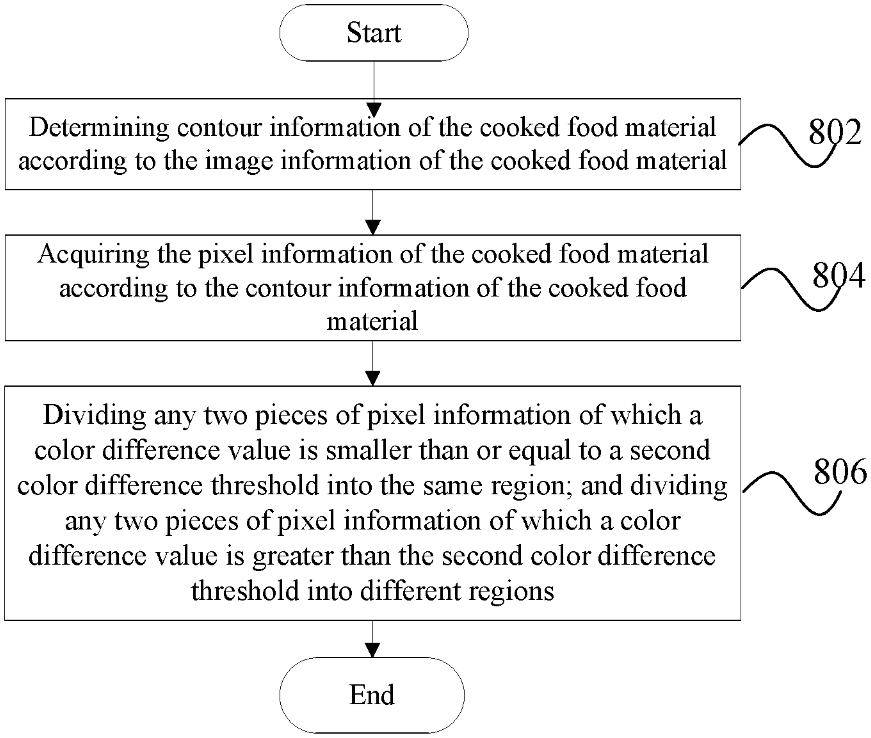
FIG. 8 shows a schematic diagram of a process that image information of a cooked food material is divided into multiple regions according to pixel information in the image information of the cooked food material in an embodiment of the present disclosure.

In any one of the above embodiments, as shown in FIG. 8, the step that the image information of the cooked food material is divided into the multiple regions according to the pixel information in the image information of the cooked food material specifically includes:

- step 802, contour information of the cooked food material is determined according to the image information of the cooked food material;
- step 804, the pixel information of the cooked food material is acquired according to the contour information of the cooked food material; and
- step 806, any two pieces of pixel information of which a color difference value is smaller than or equal to a second color difference threshold are divided into the same region; and any two pieces of pixel information of which a color difference value is greater than the second color difference threshold are divided into different regions.

The second color difference threshold is smaller than the first color difference threshold.

In this embodiment, in order to avoid increasing the heating nonuniformity of heated regions when the heating devices operate according to the by-region heating mode, the regions are divided according to the heating nonuniformity during region division, and thus, the above situation is avoided. Specifically, the image information of the cooked food material is subjected to region division according to a comparison result of a color difference value of any two pieces of pixel information and a second color difference threshold, and any two pieces of pixel information of which a color difference value is smaller than or equal to the second color difference threshold are divided into the same region; and any two pieces of pixel information of which a color difference value is greater than the second color difference threshold are divided into different regions. Due to the division performed by adopting the above manner, it is ensured that the same region is heated uniformly, and then, the cooking performance is ensured.

The second color difference threshold is smaller than the first color difference threshold to ensure that the image information of the cooked food material may be divided into the different regions.

In one of the embodiments, the second color difference threshold is set by a user.

In one of the embodiments, before the step that the target operation mode is selected according to the comparison result of the color difference value of the any two regions and the first color difference threshold, and the heating devices of the cooking apparatus are controlled to operate according to the target operation mode, the control method further includes: the cooked food material is determined according to the image information of the cooked food material; and the heating devices are controlled to operate according to an operation mode corresponding to the cooked food material.

In this embodiment, the control method further includes: the cooked food material is determined according to the image information of the cooked food material; and the heating devices are controlled to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

In any one of the above embodiments, the control method further includes: the first color difference threshold is determined according to the cooked food material.

In this embodiment, the first color difference threshold is determined according to the cooked food material. Compared with the embodiment that all cooked food materials adopt the same first color difference threshold, the present embodiment has the advantages that the probability of poorer cooking performance caused by mismatching between the first color difference threshold and the cooked food material is reduced, and the cooking performance is ensured.

Embodiment 9

Figure 9:
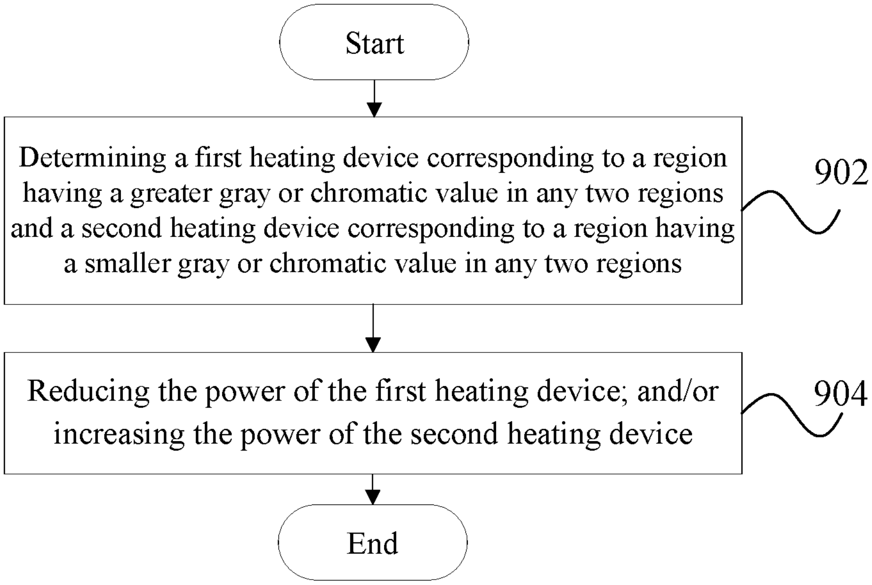
FIG. 9 shows a schematic diagram of a process that it is determined that a color difference value of any two regions is greater than a first color difference threshold, and heating devices are controlled to operate according to a by-region heating mode according to an embodiment of the present disclosure.

In any one of the above embodiments, as shown in FIG. 9, multiple heating devices are provided. The step that it is determined that the color difference value of any two regions is greater than the first color difference threshold, and the heating devices are controlled to operate according to the by-region heating mode specifically includes:

step 902, a first heating device corresponding to a region having a greater gray or chromatic value in any two regions and a second heating device corresponding to a region having a smaller gray or chromatic value in any two regions are determined; and step 904, the power of the first heating device is reduced; and/or the power of the second heating device is increased.

In this embodiment, the multiple heating devices are provided, and therefore, the heating devices corresponding to regions to be heated are first determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

Embodiment 10

Figure 10:
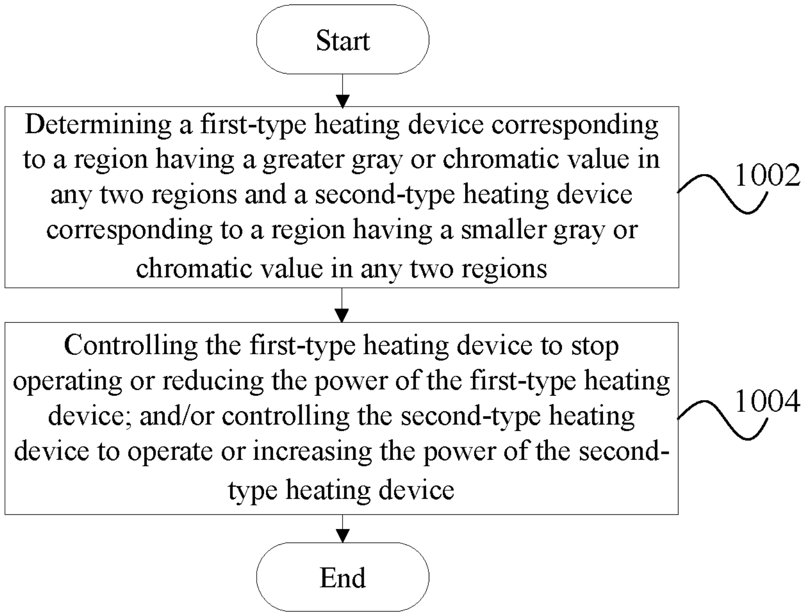
FIG. 10 shows a schematic diagram of a process that it is determined that a color difference value of any two regions is greater than a first color difference threshold, and heating devices are controlled to operate according to a by-region heating mode in an embodiment of the present disclosure.

In any one of the above embodiments, as shown in FIG. 10, at least two types of heating devices are provided. The step that it is determined that the color difference value of any two regions is greater than the first color difference threshold, and the heating devices are controlled to operate according to the by-region heating mode specifically includes:

step 1002, a first-type heating device corresponding to a region having a greater gray or chromatic value in any two regions and a second-type heating device corresponding to a region having a smaller gray or chromatic value in any two regions are determined; and step 1004, the first-type heating device is controlled to stop operating or the power of the first-type heating device is reduced; and/or the second-type heating device is controlled to operate or the power of the second-type heating device is increased.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In one of the embodiments, the heating devices perform heating in two or more manners of hot-air heating, heating tube heating, microwave heating and steam heating.

Embodiment 11

Figure 11:
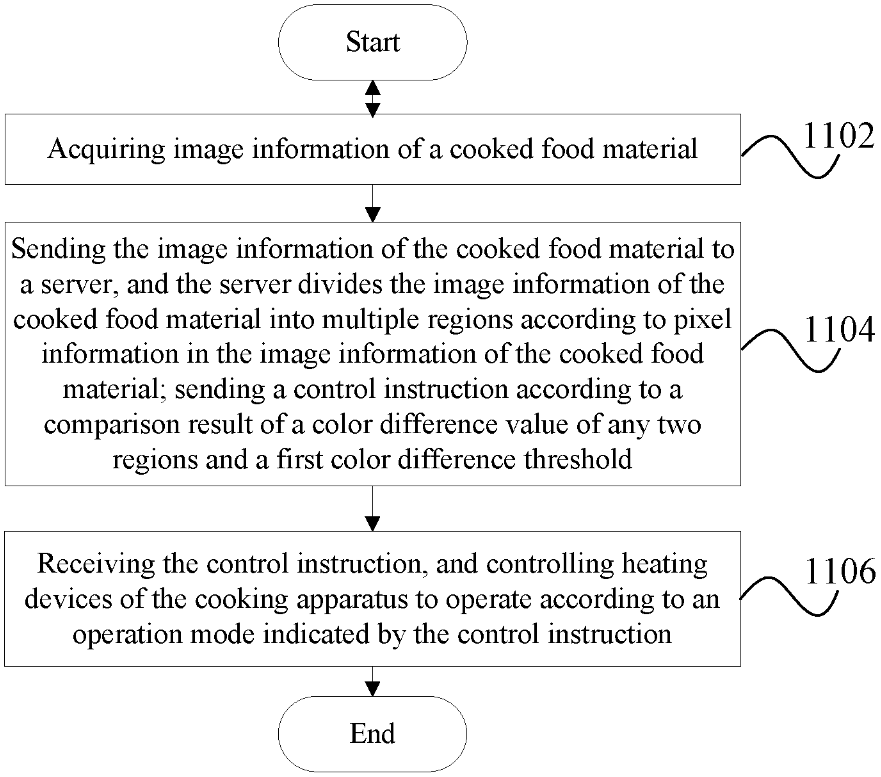
FIG. 11 shows a schematic process diagram of a control method for a cooking apparatus according to an embodiment of the present disclosure.

In an embodiment of the present disclosure, as shown in FIG. 11, a control method for a cooking apparatus includes:

step 1102, image information of a cooked food material is acquired;

step 1104, the image information of the cooked food material is sent to a server, and the server divides the image information of the cooked food material into multiple regions according to pixel information in the image information of the cooked food material; a control instruction is sent according to a comparison result of a color difference value of any two regions and a first color difference threshold; and step 1106, the control instruction is received, and heating devices of the cooking apparatus are controlled to operate according to an operation mode indicated by the control instruction.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Since the control instruction is generated by comparing the color difference value of any two regions with the first color difference threshold, it represents the heating uniformity of the cooked food material, and when the heating devices of the cooking apparatus operate according to the operation mode indicated by the control instruction, it is ensured that the cooked food material is heated uniformly, and the cooking performance is improved.

In addition, the division of the image information of the cooked food material and the generation of the control instruction are achieved by the server, and therefore, the hardware requirements, such as storage space, Hash rate, etc., on the cooking apparatus may be lowered, and then, the cost of the cooking apparatus is convenient to control.

In one of the embodiments, the control instruction includes a first control instruction or a second control instruction. The step that the control instruction is received, and the heating devices of the cooking apparatus are controlled to operate according to the operation mode indicated by the control instruction specifically includes: it is determined that the first control instruction is received, and the heating devices are controlled to further operate according to the current operation mode; and it is determined that the second control instruction is received, and the heating devices are controlled to operate according to a by-region heating mode.

In this embodiment, the control instruction is generated by comparing the color difference value of any two regions with the first color difference threshold. When the color difference value of any two regions is smaller than or equal to the first color difference threshold, it is determined that the cooked food material is heated relatively uniformly, the server generates the first control instruction, and after receiving the first control instruction, the cooking apparatus controls the heating devices to further operate according to the current operation mode to further heat the cooked food material, thereby completing cooking. When the color difference value of any two regions is greater than the first color difference threshold, it is determined that the cooked food material is heated nonuniformly, the server generates the second control instruction, after receiving the second control instruction, the cooking apparatus controls the heating devices to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

In one of the embodiments, before the step that the control instruction is sent according to the comparison result of the color difference value of any two regions and the first color difference threshold, the control method further includes: in response to a third control instruction, the heating devices are controlled to operate according to an operation mode corresponding to the cooked food material.

In this embodiment, the server further determines the cooked food material according to the image information of the cooked food material and sends the third control instruction to the cooking apparatus to control the heating devices to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

Embodiment 12

Figure 12:
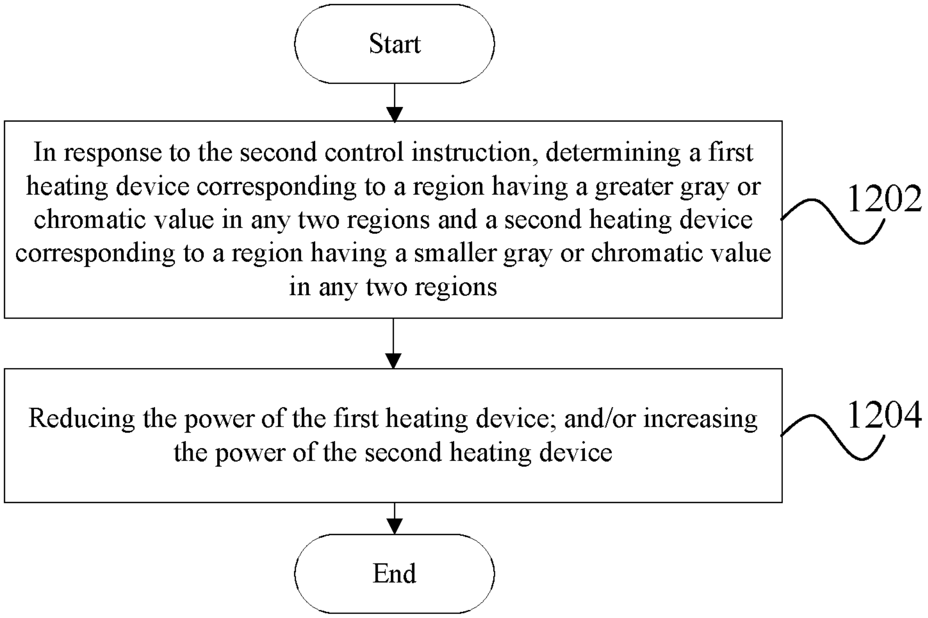
FIG. 12 shows a schematic diagram of a process that it is determined that a second control instruction is received, and heating devices are controlled to operate according to a by-region heating mode in an embodiment of the present disclosure.

In any one of the above embodiments, as shown in FIG. 12, multiple heating devices are provided. The step that it is determined that the second control instruction is received, and the heating devices are controlled to operate according to the by-region heating mode specifically includes:

step 1202, in response to the second control instruction, a first heating device corresponding to a region having a greater gray or chromatic value in any two regions and a second heating device corresponding to a region having a smaller gray or chromatic value in any two regions are determined; and step 1204, the power of the first heating device is reduced; and/or the power of the second heating device is increased.

In this embodiment, the multiple heating devices are provided, and therefore, the heating devices corresponding to regions to be heated are first determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

Embodiment 13

Figure 13:
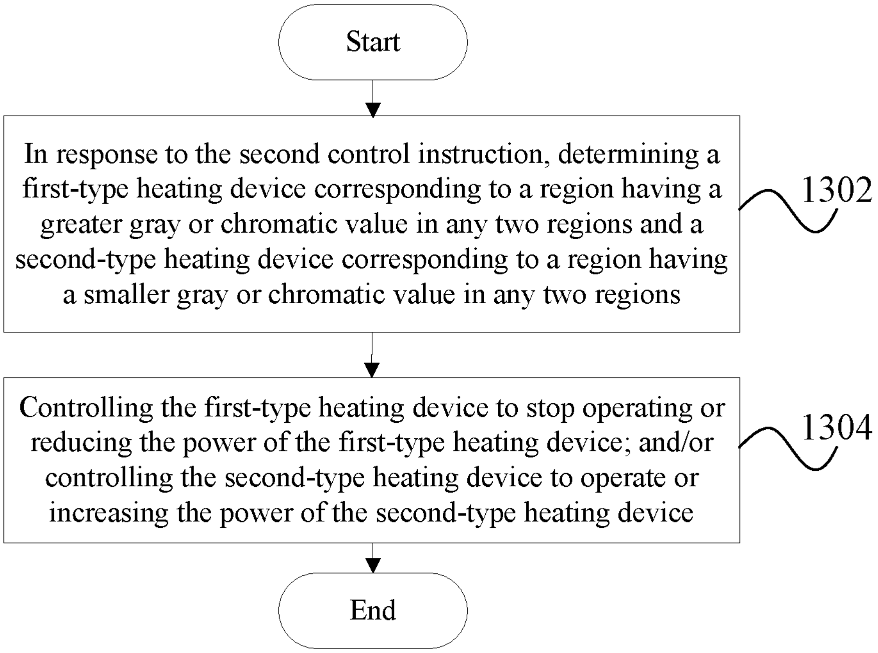
FIG. 13 shows a schematic diagram of a process that it is determined that a second control instruction is received, and heating devices are controlled to operate according to a by-region heating mode in an embodiment of the present disclosure.

In any one of the above embodiments, as shown in FIG. 13, at least two types of heating devices are provided. The step that it is determined that the second control instruction is received, and the heating devices are controlled to operate according to the by-region heating mode specifically includes:

step 1302, in response to the second control instruction, a first-type heating device corresponding to a region having a greater gray or chromatic value in any two regions and a second-type heating device corresponding to a region having a smaller gray or chromatic value in any two regions are determined; and step 1304, the first-type heating device is controlled to stop operating or the power of the first-type heating device is reduced; and/or the second-type heating device is controlled to operate or the power of the second-type heating device is increased.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In one of the embodiments, the heating devices perform heating in two or more manners of hot-air heating, heating tube heating, microwave heating and steam heating.

Embodiment 14

Figure 14:
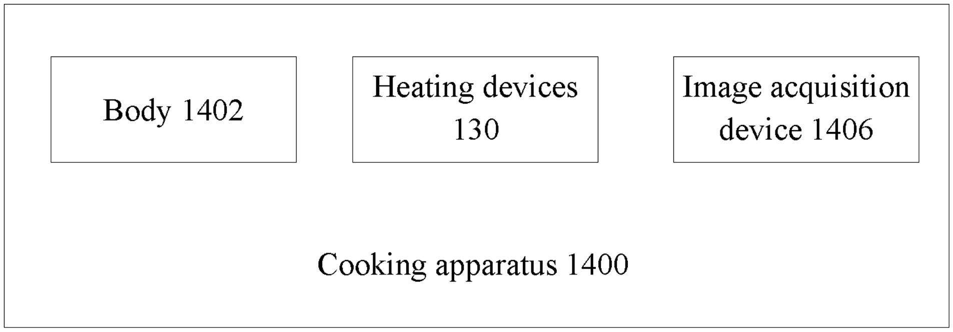
FIG. 14 shows a schematic block diagram of a cooking apparatus according to an embodiment of the present disclosure.

An embodiment of the present disclosure, as shown in FIG. 14, provides a cooking apparatus 1400 including: a body 1402, wherein the body 1402 is configured to accommodate a cooked food material; heating devices 130, wherein the heating devices 130 are configured to heat the cooked food material; an image acquisition device 1406, wherein the image acquisition device 1406 is configured to acquire image information of the cooked food material; a memory (unshown in the figure), wherein the memory stores a computer program; and a controller (unshown in the figure), wherein the controller executes the computer program to implement the steps of the control method for the cooking apparatus according to any one of the above embodiments.

According to a third aspect of the present disclosure, the present disclosure provides a cooking apparatus 1400. A controller in the cooking apparatus executes a computer program to implement the steps of the control method for the cooking apparatus according to any one of the above embodiments, and therefore, the cooking apparatus 1400 according to the embodiment of the present disclosure has all the beneficial effects of the control method for the cooking apparatus according to any one of the above embodiments, which are not enumerated one by one herein.

In one of the embodiments, multiple image acquisition devices 1406 are provided. The image information of the cooked food material includes three-dimensional information of the cooked food material.

Embodiment 15

Figure 15:
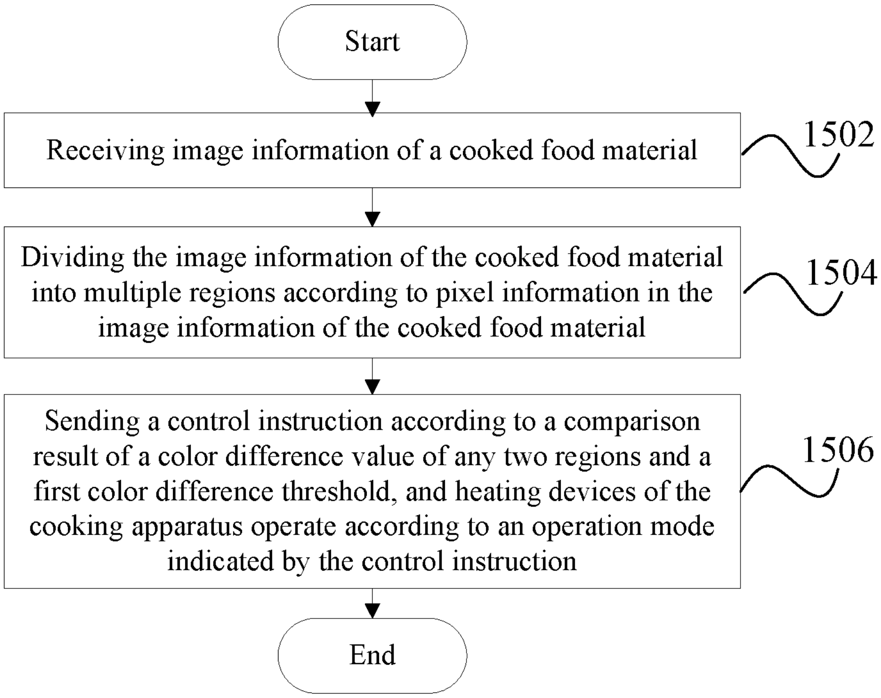
FIG. 15 shows a schematic process diagram of a control method for a cooking apparatus according to an embodiment of the present disclosure.

An embodiment of the present disclosure, as shown in FIG. 15, provides a control method for a cooking apparatus, including:

step 1502, image information of a cooked food material is received;

step 1504, the image information of the cooked food material is divided into multiple regions according to pixel information in the image information of the cooked food material; and step 1506, a control instruction is sent according to a comparison result of a color difference value of any two regions and a first color difference threshold, and heating devices of the cooking apparatus operate according to an operation mode indicated by the control instruction.

The embodiment of the present disclosure provides the control method for the cooking apparatus, in which the heating devices of the cooking apparatus are controlled by adopting the image information of the cooked food material, and influences of heating tubes of the cooking apparatus to cooking are avoided, and meanwhile, influences of a placement position of the cooked food material to cooking is also avoided. Since the control instruction is generated by comparing the color difference value of any two regions with the first color difference threshold, it represents the heating uniformity of the cooked food material, and when the heating devices of the cooking apparatus operate according to the operation mode indicated by the control instruction, it is ensured that the cooked food material is heated uniformly, and the cooking performance is improved.

In addition, the division of the image information of the cooked food material and the generation of the control instruction are achieved by a server, and therefore, the hardware requirements, such as storage space, Hash rate, etc., on the cooking apparatus may be lowered, and then, the cost of the cooking apparatus is convenient to control.

In one of the embodiments, the control instruction includes a first control instruction or a second control instruction. The step that the control instruction is sent according to the comparison result of the color difference value of any two regions and the first color difference threshold, and the heating devices of the cooking apparatus operate according to the operation mode indicated by the control instruction specifically includes: it is determined that the color difference value of any two regions is smaller than or equal to the first color difference threshold, and the first control instruction is sent, and the cooking apparatus controls the heating devices to further operate according to the current operation mode; and it is determined that the color difference value of any two regions is greater than the first color difference threshold, and the second control instruction is sent, and the cooking apparatus controls the heating devices to operate according to a by-region heating mode.

In this embodiment, the control instruction is generated by comparing the color difference value of any two regions with the first color difference threshold. When the color difference value of any two regions is smaller than or equal to the first color difference threshold, it is determined that the cooked food material is heated relatively uniformly, the server generates the first control instruction, and after receiving the first control instruction, the cooking apparatus controls the heating devices to further operate according to the current operation mode to further heat the cooked food material, thereby completing cooking. When the color difference value of any two regions is greater than the first color difference threshold, it is determined that the cooked food material is heated nonuniformly, the server generates the second control instruction, after receiving the second control instruction, the cooking apparatus controls the heating devices to operate according to the by-region heating mode, just as its name implies, the by-region heating mode refers to heating by region; and when the heating devices operate according to the by-region heating mode, the heating nonuniformity of the cooked food material may be prevented from being increased in the cooking process, and the cooked food material is heated uniformly, and then, the cooking performance is improved.

In one of the embodiments, the step that the image information of the cooked food material is divided into the multiple regions according to the pixel information in the image information of the cooked food material specifically includes: contour information of the cooked food material is determined according to the image information of the cooked food material; the pixel information of the cooked food material is acquired according to the contour information of the cooked food material; any two pieces of pixel information of which a color difference value is smaller than or equal to a second color difference threshold are divided into the same region; and any two pieces of pixel information of which a color difference value is greater than the second color difference threshold are divided into different regions; wherein the second color difference threshold is smaller than the first color difference threshold.

In this embodiment, in order to avoid increasing the heating nonuniformity of heated regions when the heating devices operate according to the by-region heating mode, the regions are divided according to the heating nonuniformity during region division, and thus, the above situation is avoided. Specifically, the image information of the cooked food material is subjected to region division according to a comparison result of a color difference value of any two pieces of pixel information and a second color difference threshold, and any two pieces of pixel information of which a color difference value is smaller than or equal to the second color difference threshold are divided into the same region; and any two pieces of pixel information of which a color difference value is greater than the second color difference threshold are divided into different regions. Due to the division performed by adopting the above manner, it is ensured that the same region is heated uniformly, and then, the cooking performance is ensured.

The second color difference threshold is smaller than the first color difference threshold to ensure that the image information of the cooked food material may be divided into the different regions.

In one of the embodiments, the control method further includes: the cooked food material is determined according to the image information of the cooked food material; and a third control instruction is sent, and the controlling apparatus controls the heating devices to operate according to an operation mode corresponding to the cooked food material.

In this embodiment, the server further determines the cooked food material according to the image information of the cooked food material and sends the third control instruction to the cooking apparatus to control the heating devices to operate according to the operation mode corresponding to the cooked food material. In such a process, the cooking apparatus may be matched with a corresponding operation mode according to the cooked food material, and the situations of cooking failure, etc. caused by mismatching between the operation modes of the heating devices and the cooked food material are avoided, and the cooking performance is ensured.

In any one of the above embodiments, the control method further includes: the first color difference threshold is determined according to the cooked food material.

In this embodiment, the first color difference threshold is determined according to the cooked food material. Compared with the embodiment that all cooked food materials adopt the same first color difference threshold, the present embodiment has the advantages that the probability of poorer cooking performance caused by mismatching between the first color difference threshold and the cooked food material is reduced, and the cooking performance is ensured.

Embodiment 16

Figure 16:
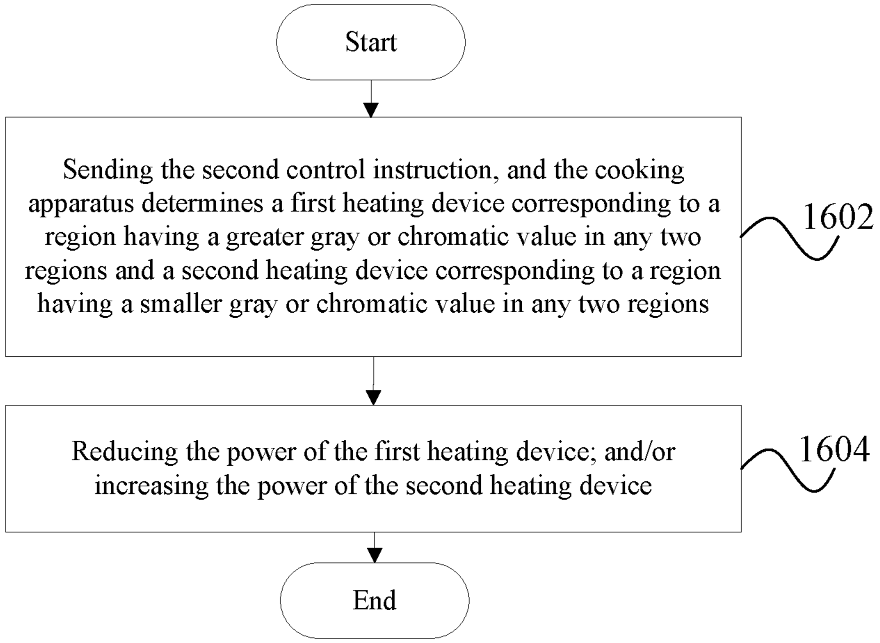
FIG. 16 shows a schematic diagram of a process that a second control instruction is sent, and a cooking apparatus controls heating devices to operate according to a by-region heating mode in an embodiment of the present disclosure.

In an embodiment of the present disclosure, as shown in FIG. 16, multiple heating devices are provided. The step that the second control instruction is sent, and the cooking apparatus controls the heating devices to operate according to the by-region heating mode specifically includes:

step 1602, the second control instruction is sent, and the cooking apparatus determines a first heating device corresponding to a region having a greater gray or chromatic value in any two regions and a second heating device corresponding to a region having a smaller gray or chromatic value in any two regions; and step 1604, the power of the first heating device is reduced; and/or the power of the second heating device is increased.

In this embodiment, the multiple heating devices are provided, and therefore, the heating devices corresponding to regions to be heated are first determined when the heating devices operate according to the by-region heating mode. Specifically, the first heating device corresponding to the region having the greater gray or chromatic value in any two regions and the second heating device corresponding to the region having the smaller gray or chromatic value in any two regions are determined; for the region having the greater gray or chromatic value in any two regions, the power of the first heating device is reduced, and the cooked food material tends to be heated uniformly; and/or, for the region having the smaller gray or chromatic value in any two regions, the power of the second heating device is increased, and the cooked food material tends to be heated uniformly, and then, the cooking performance is ensured.

Embodiment 17

Figure 17:
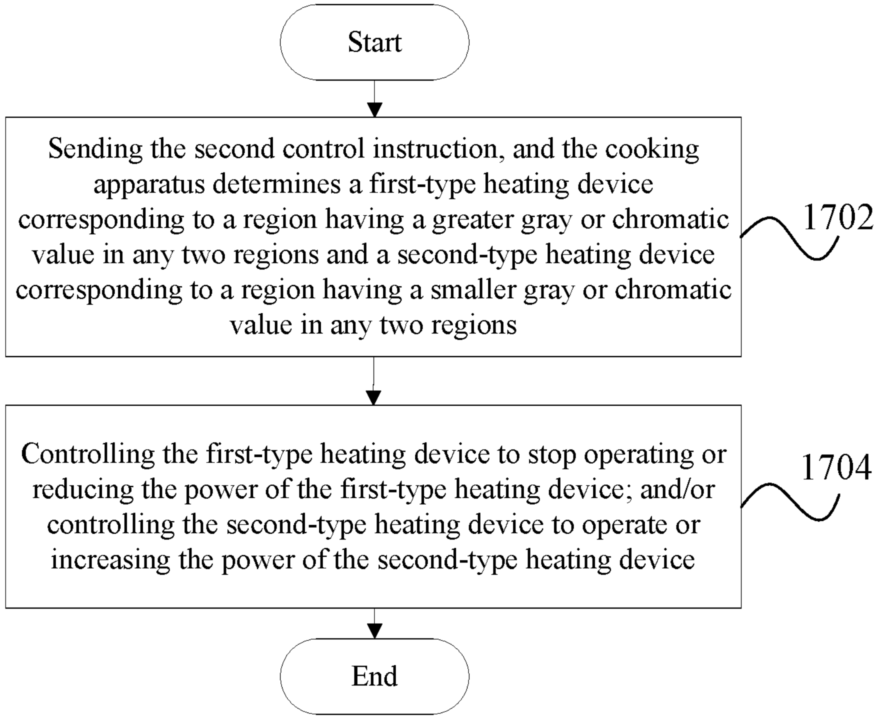
FIG. 17 shows a schematic diagram of a process that a second control instruction is sent, and a cooking apparatus controls heating devices to operate according to a by-region heating mode in an embodiment of the present disclosure.

In an embodiment of the present disclosure, as shown in FIG. 17, at least two types of heating devices are provided. The step that the second control instruction is sent, and the cooking apparatus controls the heating devices to operate according to the by-region heating mode specifically includes:

step 1702, the second control instruction is sent, and the cooking apparatus determines a first-type heating device corresponding to a region having a greater gray or chromatic value in any two regions and a second-type heating device corresponding to a region having a smaller gray or chromatic value in any two regions; and step 1704, the first-type heating device is controlled to stop operating or the power of the first-type heating device is reduced; and/or the second-type heating device is controlled to operate or the power of the second-type heating device is increased.

In this embodiment, at least two types of heating devices are provided, and therefore, the types of the heating devices corresponding to regions to be heated are first determined when the heating devices operate according to the by-region heating mode. Specifically, the first-type heating device corresponding to the region having the greater gray or chromatic value in any two regions and the second-type heating device corresponding to the region having the smaller gray or chromatic value in any two regions are determined; for the region having the greater gray or chromatic value in any two regions, the first-type heating device is controlled to stop operating or the power of the first-type heating device is reduced, and the cooked food material tends to be heated uniformly; and/or, for the region having the smaller gray or chromatic value in any two regions, the second-type heating device is controlled to operate or the power of the second-type heating device is increased, and the cooked food material tends to be heated uniformly, and then, the cooking performance is ensured.

In one of the embodiments, the heating devices perform heating in two or more manners of hot-air heating, heating tube heating, microwave heating and steam heating.

Embodiment 18

Figure 18:
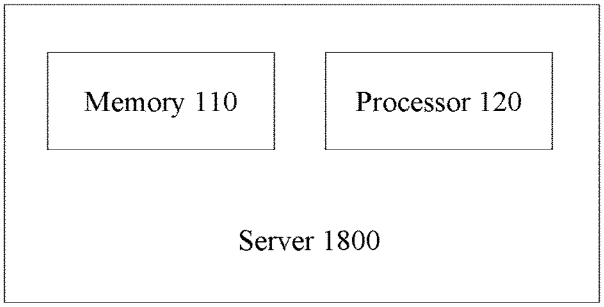
FIG. 18 shows a schematic block diagram of a server according to an embodiment of the present disclosure.

An embodiment of the present disclosure, as shown in FIG. 18, provides a server 1800 including: a memory 110 configured to store an executable instruction; and a processor 120 configured to execute the stored instruction to implement the steps of the control method for the cooking apparatus according to any one of the embodiments in the fourth aspect.

According to a fifth aspect of the present disclosure, the present disclosure provides a server 1800 including: a memory 110 and a processor 120, wherein the processor 120 executes an instruction stored in the memory 110 to implement the steps of the control method for the cooking apparatus according to any one of the above embodiments, and therefore, the server 1800 provided in the present disclosure has all the beneficial effects of the control method for the cooking apparatus according to any one of the embodiments in the fourth aspect, which are not enumerated one by one herein.

Embodiment 19

Figure 19:
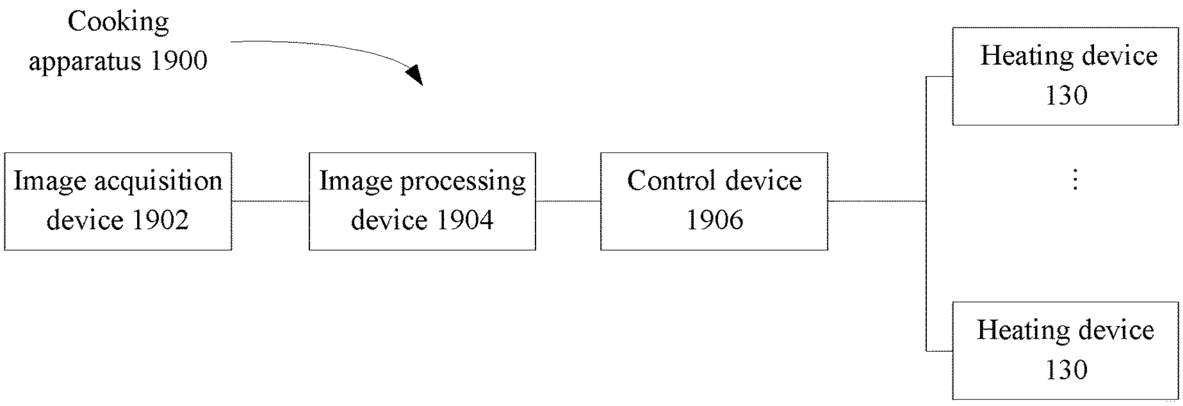
FIG. 19 shows a schematic block diagram of a cooking apparatus according to an embodiment of the present disclosure.

An embodiment of the present disclosure, as shown in FIG. 19, provides a cooking apparatus 1900 including: an image acquisition device 1902 (namely the image acquisition device related to the present disclosure) which is used to acquire an image of food inside a cooking chamber, sending the acquired image to an image processing device 1904; the image processing device 1904 which is used to recognize the contour of the food, analyze color information of the food in a food contour region and select different by-region heating methods according to the color information; and a control device 1906 (namely the controller and the memory related to the present disclosure) which is used to control the heating devices 130 to operate in different modes according to the different by-region heating methods.

Figure 20:
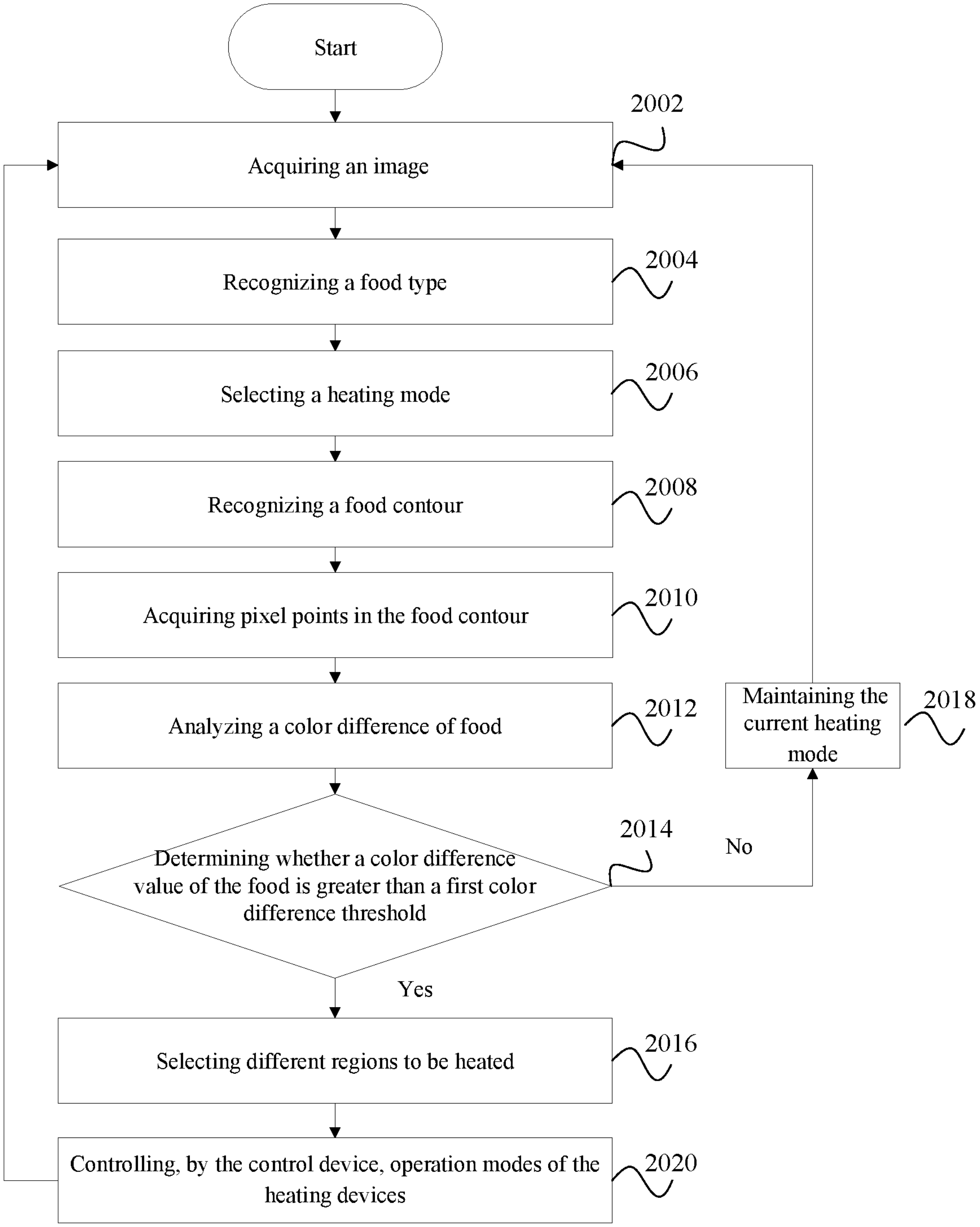
FIG. 20 shows a schematic diagram of a control process of a cooking apparatus according to an embodiment of the present disclosure.

Specifically, as shown in FIG. 20, a control process of the cooking apparatus includes:

step 2002, an image is acquired;

step 2004, a food type is recognized;

step 2006, a heating mode is selected;

step 2008, a food contour is recognized;

step 2010, pixel points are acquired in the food contour;

step 2012, a color difference of food is analyzed;

step 2014, it is determined whether a color difference value of the food is greater than a first color difference threshold, if yes, step 2016 is performed, if not, step 2018 is performed;

step 2016, different regions are selected to be heated;

step 2018, the current heating mode is maintained; and step 2020, the control device controls operation modes of the heating devices.

During cooking, a user puts food into a detectable region, and then, the image acquisition device is firstly utilized to regularly acquire information of the food in the detectable region. Specifically, the image acquisition device 1902 is one or more cameras put on the side or top of the cooking chamber, the image processing device 1904 processes image information of the food (namely the image information of the cooked food material related to the present disclosure) and identifies food material type information in the image, wherein the food material type information includes contents such as a name, etc. of the cooked food material, and different heating modes are selected according to types of food materials; the food contour in the image is recognized, the pixel points of the images in the food contour are acquired, and it is determined according to the color information of each acquisition unit (namely the regions related to the present disclosure) whether the color difference value falls within the first color difference threshold. If the color difference value is smaller than the first color difference threshold, the current heating mode is maintained to further perform acquisition. If the color difference value is greater than the first color difference threshold, different heating regions or methods are selected according to a difference. The control device 1906 controls the operation manners and modes of the heating devices 130 in the different regions according to the different heating regions or methods.

The above method for analyzing the color difference of the food includes: the image of the food is divided into different regions according to colors, that is, each region is divided into different color difference regions (namely the regions related to the present disclosure) according to color difference. The different heating regions or methods are selected by determining the color difference information of the food or according to the distribution of the different color difference regions.

The first color difference threshold determined as above may be set to be different according to the recognized food type.

By the above heating control, the cooking chamber is divided into multiple space regions, and the different heating devices 130 are disposed near the different space regions. When it is recognized that the color difference value is greater than the first color difference threshold, the heating regions or methods are adjusted, the heating device 130 corresponding to a region having a lighter color is controlled to operate or the power is controlled to be increased, and the heating device corresponding to a region having a darker color is controlled to stop operating or the power is controlled to be reduced.

The above processes of recognizing and processing the image may be performed by recognizing the image, recognizing the contour, sampling and analyzing the color and generating a heating strategy (as same as the contents in the embodiment 8 to the embodiment 14) on the cooking apparatus or uploading the image of the food to a server as well as recognizing the image, recognizing the contour, sampling and analyzing the color and generating a heating strategy (as same as the contents in the embodiment 15 to the embodiment 18) on a server side.

The acquired image information of the cooked food material may be information of different regions of overall food or multiple regions of multiple food dispersed in the cooking chamber. The colors of different positions of the overall food such as roasted chicken may be inconsistent, and therefore, the chicken may be divided into different color regions; and for the multiple dispersed food such as cookies, a cookie may be divided into a color region, and therefore, the color change of the cookies distributed on the different positions is analyzed. Then, a difference of color regions (namely the color difference value of any two regions related to the present disclosure) is compared with a first color difference threshold, and if the difference is greater than the first color difference threshold, the heating device 130 corresponding to the region having the lighter color is selected for heating.

If the above color difference value is greater than the first color difference threshold, different heating regions or methods are selected according to the difference, and the operation power of the heating devices 130 in the corresponding regions may be adjusted according to the color difference. If the color difference value is greater, the power of the heating device 130 corresponding to the region having the lighter color is set to be higher, and the power of the heating device 130 corresponding to the region having the darker color is set to be lower.

In an embodiment of the present disclosure, the cooking apparatus is a baking oven, with the baking of cookies as an example, a control process of the cooking apparatus includes:

step 1, a user uniformly puts a cookie material into a baking tray;

step 2, the baking tray is put into a chamber of the baking oven, after it is detected by the baking oven that a door of the baking oven is normally closed, a camera located on the obverse side of the chamber picks up an image of the food in the baking tray and sends the image to the image processing device 1904;

step 3, the image processing device 1904 recognizes a type of the food material in the image and sends information of the food material (which is the cookies herein) to the control device 1906, and the control device 1906 controls heating (double-upper-tube heating is selected herein) according to a cooking program of a preset type, wherein heating parameters include: 180 DEG C., 25 min;

step 4, the image processing device 1904 recognizes a region where the food is located in the image, uniformly acquires a certain number of pixel points in the region where the food is located, analyzes a color difference of the pixel points, and divides the points of which the difference falls within a certain range (namely the second color difference threshold related to the present disclosure) into the same color region;

step 5, a color difference value of any different color regions is compared with the first color difference threshold of the food, if the color difference value of a certain region is greater than the first color difference threshold, by-region heating is used. With the cookies as an example, if a difference value of a color (which is darker) in a region on the lower side of the baking tray and a color (which is lighter) in a region on the upper side of the baking tray is greater than the first color difference threshold, by-region heating is selected, the power of a heating tube corresponding to the region having the darker color is reduced, and the power of a heating tube corresponding to the region having the lighter color is increased; and step 6, the steps 1 to 5 described as above are repeated until the color difference value of any different color regions is smaller than the first color difference threshold of the food, and then, a default cooking state is restored or the cooking time is ended to stop cooking.

In this embodiment, the operation modes of the heating devices 130 in the different regions are controlled to ensure that the different regions of the food are heated more uniformly, thereby improving the user experience.

Embodiment 20

An embodiment of the present disclosure provides a computer readable storage medium storing a computer program, wherein when the computer program is executed, the steps of the control method for the cooking apparatus according to any one of the above embodiments are implemented, and therefore, the computer readable storage medium according to the embodiment of the present disclosure has all the beneficial effects of the control method for the cooking apparatus according to any one of the above embodiments, which are not enumerated one by one herein.

A heating control method and a cooking apparatus according to embodiments of the present disclosure will be described below with reference to the accompanying drawings.

Figure 21:
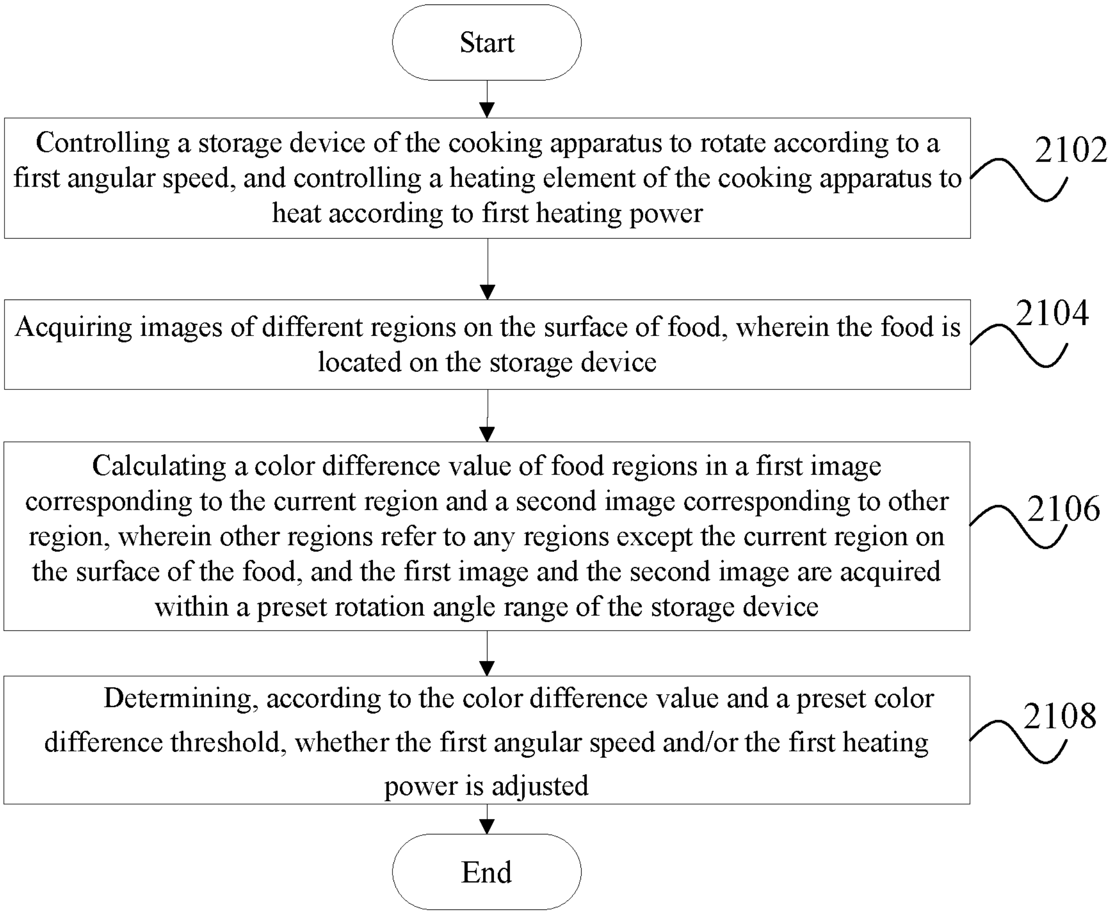
FIG. 21 shows a process diagram of a heating control method according to the present disclosure.

Firstly, a heating control method according to an embodiment of the present disclosure is described. FIG. 21 shows a process diagram of a heating control method according to an embodiment of the present disclosure.

As shown in FIG. 21, the heating control method according to the embodiment of the present disclosure may be applied to a cooking apparatus such as an electric oven, etc. The method includes the following steps.

Step 2102, a storage device of the cooking apparatus is controlled to rotate according to a first angular speed, and a heating element of the cooking apparatus is controlled to heat according to first heating power.

The storage device of the cooking apparatus may rotate in a manner of base rotation, transverse rotation or longitudinal rotation. The heating element of the cooking apparatus may consist of one or more electric heating tubes. The storage device and the heating element may be fixedly mounted in a cooking chamber of the cooking apparatus and are in a constant relative position relationship.

The first angular speed and the first heating power may be constant or determined according to a type of roasted food. For example, first angular speeds and first heating power corresponding to roasted chicken and roasted duck may be different, and their specific values may be set as a matter of experience or fact.

Therefore, according to an implementation of the present disclosure, before the step 2102, the heating control method may further include the step that a food type of the food on the storage device is analyzed; and the first angular speed and the first heating power are acquired according to a correspondence between the food type and a heating condition. The correspondence between the food type and the heating condition is preset. Specifically, the food type (such as, chicken, duck, etc.) may be obtained by picking up an image of food on the storage device and recognizing and analyzing the image.

Step 2104, images of different regions on the surface of food are acquired, wherein the food is located on the storage device.

Specifically, according to a condition for acquisition after the storage device rotates for a first preset angle, the images of the food on the storage device may be continuously acquired to obtain the images corresponding to the different regions on the surface of the food. Or the images of the food on the storage device may be acquired in real time, and the images corresponding to the different regions on the surface of the food are acquired according to a preset condition; and the preset condition includes: every time when the storage device rotates at a second preset angle, or every time when the storage device rotates for a preset time interval. Of course, image acquisition may also be performed on the surface of the food by selecting an appropriate pickup condition according to the food type.

For example, the storage device rotates according to the first angular speed, and after it is detected that the storage device rotates for a certain angle, images of the food on the storage device are picked up, for example, the images are picked up once every time when the storage device rotates for 60 DEG. An angle sensor may be mounted to detect a rotation angle. It may be understood that an angle of rotating the food for a cycle is 360 DEG, the images are picked up once every time when the storage device rotates for 60 DEG, that is, six images are acquired from the regions on the surface of a circumference of the food.

The food on the storage device may be picked up by an image acquisition unit (such as a camera, etc.), and the image acquisition unit may be put on the top or side of the cooking chamber to face the cooking chamber.

Step 2106, a color difference value of food regions in a first image corresponding to the current region and a second image corresponding to other regions is calculated, wherein other regions refer to any regions except the current region on the surface of the food, and the first image and the second image are acquired within a preset rotation angle range of the storage device.

It may be understood that the colors of the food regions in the acquired images may represent heating states of the corresponding food regions, and the color difference value of the food regions in the first image corresponding to the current region and the second image corresponding to other regions is a difference of heating states of the current food region and other food regions. The first image and the second image are acquired within the preset rotation angle range (such as 360 DEG) of the storage device, because the storage device rotates all the time. An image of the surface of the food which is initially roasted greatly differs from an image of the surface of the food which is roasted for a period of time, and therefore, the two images which are compared in color difference in the present embodiment are acquired within a certain range of rotation angle of the storage device.

According to an implementation of the present disclosure, the step that the color difference value of the food regions in the image corresponding to the current region and the image corresponding to other regions is calculated may be specifically implemented as that: a contour of a food region in each image is recognized; a preset number of pixel points are uniformly acquired in the contour; and a color difference value of the pixel points acquired in the image corresponding to the current region and the image corresponding to other regions is calculated. More specifically, the color difference value (which may also be called as color difference) of the pixel points acquired in the image corresponding to the current region and the image corresponding to other regions may also be calculated on the basis of an HSV color space. In the present disclosure, HSV (which is named as Hue, Saturation, Value) is a color space created according to an intuitive feature of the color and is also called as a hexagonal conical model, and color parameters in the model are respectively hue (H), saturation (S) and value (V). Of course, other color spaces may also be adopted, which is not limited herein in the present disclosure.

It should be noted that the color difference value of the food regions in the current image and other images is obtained by subtracting color values of the food regions in other images from a color value of the food region in the current image, if the result is negative, the color of the food region in the current image is lighter than the colors of the food regions in other images, otherwise, the color of the food region in the current image is darker than the colors of the food regions in other images.

Step 2108, it is determined, according to the color difference value and a preset color difference threshold, whether the first angular speed and/or the first heating power is adjusted.

After the difference (namely the color difference) of the heating states of the current food region and other food regions is obtained, in order to improve the food heating uniformity, the angular speed of rotation of the storage device and the heating power of the heating element may be adjusted.

Specifically, the step that the first angular speed is adjusted according to the color difference value and the preset color difference threshold may specifically include: if the color difference value is between the minimum color difference threshold and the maximum color difference threshold, the first angular speed is maintained; if the color difference value is smaller than the minimum color difference threshold, the first angular speed is adjusted to a second angular speed, wherein the second angular speed is smaller than the first angular speed; and if the color difference value is greater than the maximum color difference threshold, the first angular speed is adjusted to a third angular speed, wherein the third angular speed is greater than the first angular speed.

Specifically, the step that the first heating power is adjusted according to the color difference value and the preset color difference threshold may specifically include: if the color difference value is between the minimum color difference threshold and the maximum color difference threshold, the first heating power is maintained; if the color difference value is smaller than the minimum color difference threshold, the first heating power is adjusted to second heating power, wherein the second heating power is greater than the first heating power; and if the color difference value is greater than the maximum color difference threshold, the first heating power is adjusted to third heating power, wherein the third heating power is smaller than the first heating power.

In other words, if the difference of the heating states of the current food region and other food regions falls within the preset color difference range (between the minimum color difference threshold and the maximum color difference threshold), the current heating condition is appropriate, and no changes needs to be made. If the difference of the heating states of the current food region and other food regions exceeds the preset color difference range, the current heating condition may be changed. Specifically, the angular speed of rotation of the storage device may be reduced or increased to prolong or shorten the heating time of the current food region, or the heating power of the heating element may be increased or reduced to improve or lower the heating intensity of the current food region, thereby reducing the difference of the heating states of the current food region and other food regions and improving the heating uniformity of the overall food.

For example, if the color difference of adjacent food regions exceeds the preset color difference range and the current food region is lighter in color under the current rotation angle, the rotation speed is reduced and/or the heating power is increased; and if the color difference of the food regions exceeds the preset color difference range and the color is darker under the current rotation angle, the rotation speed is increased and/or the heating power is reduced (even the heating element stops operating), and thus, the rotation speed and the heating power are adjustable within 360 DEG according to the coloring effect of the food.

The above processes of recognizing and processing the image may be performed by recognizing the image, recognizing the contour of the food, sampling and analyzing the color and generating a heating strategy on a local side of the cooking apparatus or uploading the image of the food to a network server.

By using the heating control method according to the embodiment of the present disclosure, the color difference of the different regions of the food may be monitored in real time, the heating strategy is adjusted in real time to control the angular speed of rotation of the storage device and the heating power of the heating element, and the heating time and the heating intensity are adjusted according to the color change of the food, and the different regions of the food are heated more uniformly.

Figure 22:
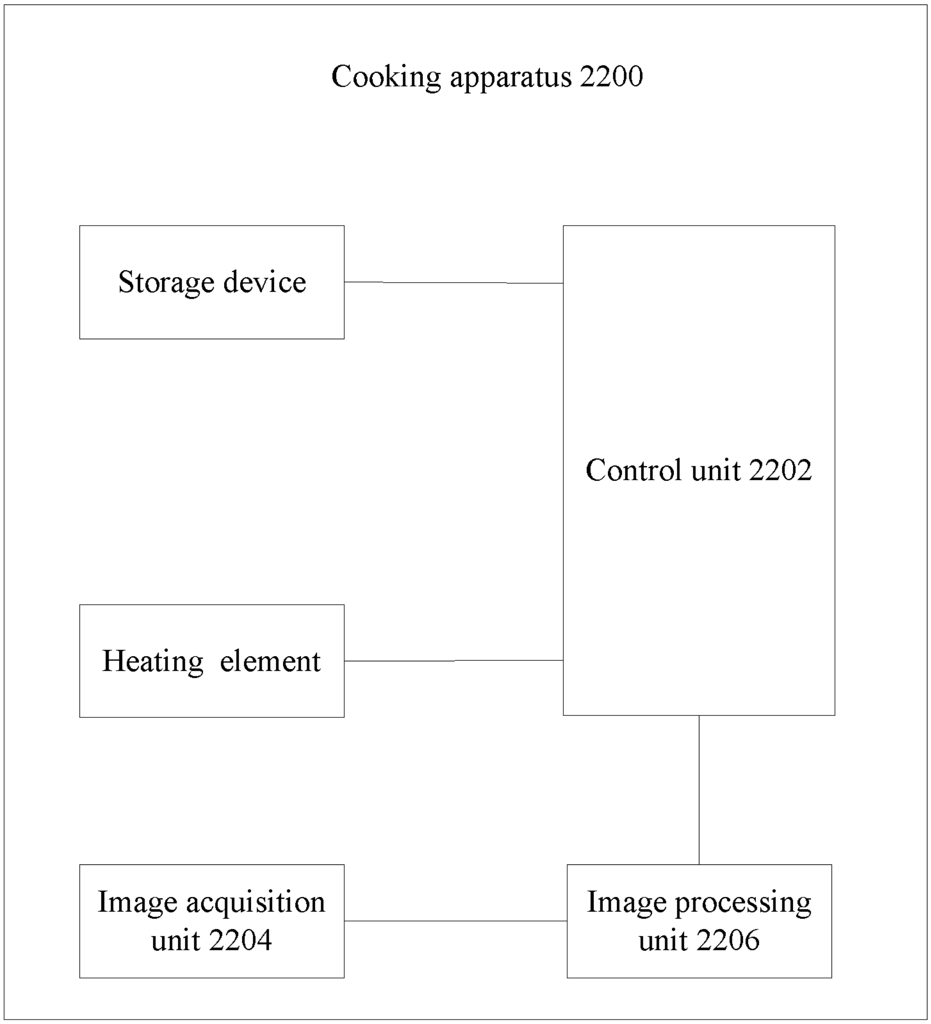
FIG. 22 shows a schematic structural diagram of a cooking apparatus according to the present disclosure.

FIG. 22 shows a structural diagram of a cooking apparatus according to an embodiment of the present disclosure. As shown in FIG. 22, an embodiment of the present disclosure further provides a cooking apparatus 2200. The cooking apparatus 2200 may include:

- a control unit 2202 used to control a storage device of the cooking apparatus to rotate according to a first angular speed, and control a heating element of the cooking apparatus to heat according to first heating power;
- an image acquisition unit 2204 used to acquire images of different regions on the surface of food, wherein the food is located on the storage device; and
- an image processing unit 2206 used to calculate a color difference value of food regions in a first image corresponding to the current region and a second image corresponding to other regions, wherein other regions refer to any regions except the current region on the surface of the food, and the first image and the second image are acquired within a preset rotation angle range of the storage device; wherein
- the control unit 2202 is further used to determine, according to the color difference value and a preset color difference threshold, whether the first angular speed and/or the first heating power is adjusted.

According to an implementation of the present disclosure, the image processing unit 2204 is specifically used to continuously acquire, according to a condition for acquisition after the storage device rotates for a first preset angle, the images of the food on the storage device to obtain the images corresponding to the different regions on the surface of the food.

According to an implementation of the present disclosure, the image processing unit 2204 is specifically used to acquire the images of the food on the storage device in real time, and acquire the images corresponding to the different regions on the surface of the food according to a preset condition; and the preset condition includes: every time when the storage device rotates at a second preset angle, or every time when the storage device rotates for a preset time interval.

According to an implementation of the present disclosure, the cooking apparatus 2200 may further include an acquisition unit used to:

- before the control unit controls the storage device of the cooking apparatus to rotate according to the first angular speed, and controls the heating element of the cooking apparatus to heat according to the first heating power, analyze a food type of the food on the storage device; and
- acquire the first angular speed and the first heating power according to a correspondence between the food type and a heating condition.

According to an implementation of the present disclosure, the image processing unit 2206 is specifically used to:

- recognize a contour of a food region in each image;
- uniformly acquire a preset number of pixel points in the contour; and
- calculate a color difference value of the pixel points acquired in the first image corresponding to the current region and the second image corresponding to other regions.

According to an implementation of the present disclosure, the image processing unit 2206 is used to calculate, on the basis of an HSV color space, the color difference value of the pixel points acquired in the first image corresponding to the current region and the second image corresponding to other regions.

According to an implementation of the present disclosure, the control unit 2202 is specifically used to:

- if the color difference value is between the minimum color difference threshold and the maximum color difference threshold, maintain the first angular speed;
- if the color difference value is smaller than the minimum color difference threshold, adjust the first angular speed to a second angular speed, wherein the second angular speed is smaller than the first angular speed; and
- if the color difference value is greater than the maximum color difference threshold, adjust the first angular speed to a third angular speed, wherein the third angular speed is greater than the first angular speed.

According to an implementation of the present disclosure, the control unit 2202 is specifically used to:

- if the color difference value is between the minimum color difference threshold and the maximum color difference threshold, maintain the first heating power;
- if the color difference value is smaller than the minimum color difference threshold, adjust the first heating power to second heating power, wherein the second heating power is greater than the first heating power; and
- if the color difference value is greater than the maximum color difference threshold, adjust the first heating power to third heating power, wherein the third heating power is smaller than the first heating power.

The specific operation principle and benefits of the cooking apparatus according to the embodiment of the present disclosure are similar to those of the heating control method according to the above embodiment of the present disclosure, the descriptions thereof will be omitted herein.

The above cooking apparatus is further introduced below with a specific embodiment.

Figure 23:
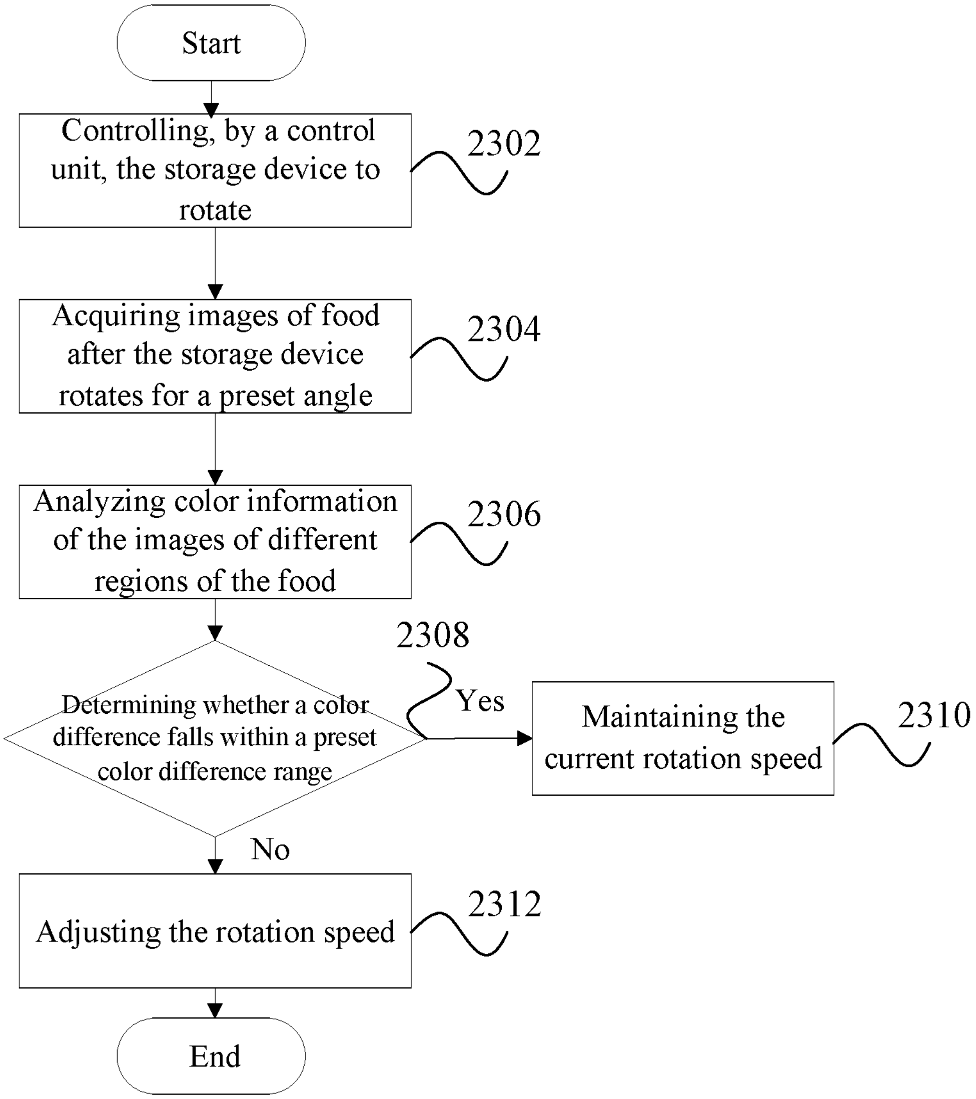
FIG. 23 shows a process diagram of a control method for a storage device according to the present disclosure.

With control on a transversely rotating storage rack applied to a baking oven as an example, referring to FIG. 23 which shows a process diagram of a control method for a storage device, the specific execution steps are described as follows:

step 2302, a control unit controls the storage device to rotate;

step 2304, images of food are acquired after the storage device rotates for a preset angle;

step 2306, color information of the images of different regions of the food is analyzed;

step 2308, it is determined whether a color difference falls within a preset color difference range, if yes, step 2310 is performed, if not, step 2312 is performed;

step 2310, the current rotation speed is maintained; and step 2312, the rotation speed is adjusted.

Its detailed processes are described as follows:

step 1, a user wraps food (such as chicken) and puts it on the storage device in the baking oven, wherein a heating tube (the heating element) is located above a cooking chamber, and a camera (the image acquisition unit) is located on the side of the baking oven; an included angle of a central line of the view of the camera and a radial central line of the heating tube of the baking oven is 60 DEG; and the storage device rotates in a direction from a camera region to a heating tube region;

step 2, after it is detected by the baking oven that a door of the baking oven is normally closed, the control unit controls the storage device to rotate at a constant angular speed of 6 circles/min;

step 3, the control unit receives the current rotation speed of the storage device, and when the storage device is fixed at 0-DEG, 60-DEG, 120-DEG, 180-DEG, 240-DEG and 300-DEG angles with a central point of the heating tube as a reference, the camera is controlled to pick up an image of the food on the storage device, and the image is sent to the image processing unit;

step 4, the image processing unit recognizes a region where the food is located in the image, uniformly acquires a certain number of pixel points in the region where the food is located, and analyzes a color difference of the pixel points of the image at different angles;

step 5, a color difference value of the image at any different angles is compared with a preset color difference range of the food, if the color difference value of the image at a certain angle exceeds the preset color difference range, a heating method is adjusted, and the rotation speed at the corresponding angle is adjusted to change the heating time. For example, in an image showing the 180-DEG angle of a grill, the color of the abdomen of the chicken is lighter, and in an image showing the 0-DEG angle, the color of the back of the chicken is darker. If the color difference value of the two regions exceeds the preset color difference range, the control unit controls the storage device to reduce the rotation speed when rotating to the 180-DEG angle and increase the rotation speed when rotating to the 0-DEG angle; and step 6, the step 3 described as above is repeated until the color difference value of the image at any different color angles falls within the preset color difference range of the food, the cooking state is continuously maintained until the color difference value of the image at the different angles exceeds the preset color difference range once more or the cooking time is ended to stop cooking. The preferred implementations of the present disclosure are described in detail as above in combination with the accompanying drawings, however, the embodiments of the present disclosure are not limited to concrete details in the above implementations. Various simple modifications may be made on the embodiments in the embodiments of the present disclosure within the scope of the technical conception of the embodiments of the present disclosure, and these simple modifications fall within the protection scope of the present disclosure.

Moreover, it should be noted that all the specific technical features described in the above specific implementations may be combined in any proper manner without conflicts. In order to avoid unnecessary repetition, various possible combination manners are no longer described additionally in the present disclosure.

It can be understood by the skilled in the art that all or parts of steps of the methods in the above embodiments can be completed by a program instructing relevant hardware. The program is stored in a storage medium and includes several instructions for enabling one (which may be a single chip microcomputer, a chip, etc.) or a processor to perform all or parts of the steps of the method in each of the embodiments of the present disclosure. The above storage medium includes various media, such as a U disk, a mobile hard disk, an ROM (Read-Only Memory), an RAM (Random Access Memory), a diskette or an optical disk, capable of storing program codes.

In addition, various different implementations in the embodiments of the present disclosure can also be arbitrarily combined, and they should be also regarded as contents disclosed by the embodiments of the present disclosure as long as they do not depart from the spirit of the embodiments of the present disclosure.

In the illustration of the present description, the term "multiple" means two or more unless otherwise clearly limited. Directional or positional relationships indicated by terms such as "upper" and "lower" are directional or positional relationships on the basis of the accompanying drawings, are merely intended to facilitate describing the present disclosure and simplifying the illustration, rather than to indicate or imply that the appointed device or device has to be located in a specific direction or structured and operated in the specific direction so as not to be understood as restrictions on the present disclosure. The terms "connected", "mounted", "fixed", etc. should be understood in a broad sense. For example, "connection" can be a fixed connection or detachable connection or integral connection; it can be a direct connection or indirect connection through an intermediate medium. The specific meanings of the above terms in the present disclosure will be understood by those of ordinary skill in the art, as the case may be.

In the illustration of the present description, terms such as "first" and "second" are merely for descriptive purposes, but cannot be understood as indicating or implying the relative importance unless otherwise clearly specified and limited. The terms "connected", "mounted", "fixed", etc. should be understood in a broad sense. For example, "connection" can be a fixed connection or detachable connection or integral connection; it can be a direct connection or indirect connection through an intermediate medium. The specific meaning of the above terms in the present disclosure will be understood by those of ordinary skill in the art, as the case may be.

In the illustration of the present description, the description of the terms "one embodiment", "some embodiments", "specific embodiments", etc. means that the specific features, structures, materials or characteristics described in conjunction with the embodiments or examples are included in at least one embodiment or example in the present disclosure. In the present description, schematic representations of the above terms do not necessarily refer to the same embodiment or example. Furthermore, the described specific features, structures, materials, or characteristics may be combined in any suitable manner in any one or more embodiments or examples.

The above is only a preferred embodiment of the present disclosure and is not intended to limit the present disclosure, as various modifications and changes therein will occur to those skilled in the art. Any modifications, equivalents, improvements, etc. that come within the spirit and principles of the present disclosure are intended to be included within the protection scope of the present disclosure.

What is claimed is:

1. A cooking apparatus, wherein the cooking apparatus comprises heating devices and multiple heating regions, any one of the heating regions is provided with a heating device, a memory, and a processor, the memory stores a computer program comprising instructions that, when executed by the processor, cause the processor to perform operations comprising:

acquiring image information of a cooked food material in the cooking apparatus;

identifying the image information, and acquire a food type and a cooking doneness of food corresponding to any one of the heating regions by dividing the image information of the cooked food material into multiple regions according to pixel information in the image information of the cooked food material;

selecting a target operation mode according to a comparison result of a color difference value of any two regions and a first color difference threshold, and controlling heating devices of the cooking apparatus to operate according to the target operation mode, wherein selecting the target operation mode according to the comparison result of the color difference value of any two regions and the first color difference threshold, and controlling the heating devices of the cooking apparatus to operate according to the target operation mode comprises:

determining that the color difference value of any two regions is equal to or smaller than the first color difference threshold, and controlling the heating devices to further operate according to a current operation mode; and determining that the color difference value of any two regions is greater than the first color difference threshold, and controlling the heating devices to operate according to a by-region heating mode.

2. The cooking apparatus according to claim 1, wherein controlling, according to the food type and the cooking doneness of the food, the operation of the heating device comprises:

acquiring heating parameters according to the food type and the cooking doneness of the food; and controlling, according to the heating parameters, the operation of the heating device in the corresponding heating region.

3. The cooking apparatus according to claim 2, wherein the heating parameter comprises one or more of: a heating temperature, a heating power and a heating duration.

4. The cooking apparatus according to claim 1, wherein the processor is further caused to perform operations comprising:

acquiring the current heating temperature of any one of the heating regions; and further controlling, according to the current heating temperature, the operation of the heating device in the corresponding heating region.

5. The cooking apparatus according to claim 1, wherein acquiring the image information of the food in the cooking apparatus comprises:

acquiring the image information of the food in the cooking apparatus in a cooking process.

6. A control method for a cooking apparatus, comprising:

acquiring image information of a cooked food material;

dividing the image information of the cooked food material into multiple regions according to pixel information in the image information of the cooked food material;

selecting a target operation mode according to a comparison result of a color difference value of any two regions and a first color difference threshold, and controlling heating devices of the cooking apparatus to operate according to the target operation mode, wherein selecting the target operation mode according to the comparison result of the color difference value of any two regions and the first color difference threshold, and controlling the heating devices of the cooking apparatus to operate according to the target operation mode comprises:

determining that the color difference value of any two regions is equal to or smaller than the first color difference threshold, and controlling the heating devices to further operate according to a current operation mode; and determining that the color difference value of any two regions is greater than the first color difference threshold, and controlling the heating devices to operate according to a by-region heating mode.

7. The control method for the cooking apparatus according to claim 6, wherein dividing the image information of the cooked food material into the multiple regions according to the pixel information in the image information of the cooked food material comprises:

determining contour information of the cooked food material according to the image information of the cooked food material;

acquiring the pixel information of the cooked food material according to the contour information of the cooked food material;

dividing any two pieces of pixel information of which a color difference value is smaller than or equal to a second color difference threshold into the same region; and dividing any two pieces of pixel information of which a color difference value is greater than the second color difference threshold into different regions;

wherein the second color difference threshold is smaller than the first color difference threshold.

8. The control method for the cooking apparatus according to claim 6, wherein multiple heating devices are provided;

the step of determining that the color difference value of any two regions is greater than the first color difference threshold, and controlling the heating devices to operate according to the by-region heating mode comprises:

determining a first heating device corresponding to a region having a greater gray or chromatic value in any two regions and a second heating device corresponding to a region having a smaller gray or chromatic value in any two regions;

reducing the power of the first heating device;

increasing the power of the second heating device; or reducing the power of the first heating device and increasing the power of the second heating device.

9. The control method for the cooking apparatus according to claim 6, wherein at least two types of heating devices are provided;

determining that the color difference value of any two regions is greater than the first color difference threshold, and controlling the heating devices to operate according to the by-region heating mode comprises:

determining a first-type heating device corresponding to a region having a greater gray or chromatic value in any two regions and a second-type heating device corresponding to a region having a smaller gray or chromatic value in any two regions;

controlling the first-type heating device to stop operating or reducing the power of the first-type heating device;

controlling the second-type heating device to operate or increasing the power of the second-type heating device, or controlling the first-type heating device to stop operating or reducing the power of the first-type heating device and controlling the second-type heating device to operate or increasing the power of the second-type heating device.

10. The control method for the cooking apparatus according to claim 6, further comprising:

before selecting the target operation mode according to the comparison result of the color difference value of the any two regions and the first color difference threshold, and controlling the heating devices of the cooking apparatus to operate according to the target operation mode:

determining the cooked food material according to the image information of the cooked food material; and controlling the heating devices to operate according to an operation mode corresponding to the cooked food material.

11. The control method for the cooking apparatus according to claim 10, further comprising:

determining the first color difference threshold according to the cooked food material.

12. The control method for the cooking apparatus according to claim 6, further comprising:

controlling a storage device of the cooking apparatus to rotate according to a first angular speed, and controlling a heating element of the cooking apparatus to heat according to first heating power;

acquiring images of different regions on the surface of food, wherein the food is located on the storage device;

calculating a color difference value of food regions in a first image corresponding to the current region and a second image corresponding to other regions, wherein other regions refer to any regions except the current region on the surface of the food, and the first image and the second image are acquired within a preset rotation angle range of the storage device; and determining, according to the color difference value and a preset color difference threshold, whether the first angular speed or the first heating power is adjusted.

13. The control method for the cooking apparatus according to claim 12, wherein acquiring the images of the different regions on the surface of the food comprises:

continuously acquiring, according to a condition for acquisition after the storage device rotates for a first preset angle, the images of the food on the storage device to obtain the images corresponding to the different regions on the surface of the food.

14. The control method for the cooking apparatus according to claim 12, wherein acquiring the images of the different regions on the surface of the food comprises:

acquiring the images of the food on the storage device in real time, and acquiring the images corresponding to the different regions on the surface of the food according to a preset condition; and wherein the preset condition comprises: every time when the storage device rotates at a second preset angle, or every time when the storage device rotates for a preset time interval.

* * * * *